US012209400B2

(12) United States Patent
Turner et al.

(10) Patent No.: US 12,209,400 B2
(45) Date of Patent: Jan. 28, 2025

(54) DRAIN CLEANING DEVICE

(71) Applicants: Stephen S. Turner, Edelstein, IL (US); Scott I. Turner, Chillicothe, IL (US)

(72) Inventors: Stephen S. Turner, Edelstein, IL (US); Scott I. Turner, Chillicothe, IL (US)

( * ) Notice: Subject to any disclaimer, the term of this patent is extended or adjusted under 35 U.S.C. 154(b) by 485 days.

(21) Appl. No.: 17/556,852

(22) Filed: Dec. 20, 2021

(65) Prior Publication Data

US 2022/0112703 A1 Apr. 14, 2022

Related U.S. Application Data

(63) Continuation-in-part of application No. 17/113,678, filed on Dec. 7, 2020, now Pat. No. 11,898,338, which is a continuation-in-part of application No. 16/580,635, filed on Sep. 24, 2019, now Pat. No. 10,857,577, said application No. 17/113,678 is a continuation of application No. PCT/US2020/031954, filed on May 7, 2020, which is a continuation-in-part of application No. 16/580,635, filed on Sep. 24, 2019, now Pat. No. 10,857,577.

(60) Provisional application No. 62/844,458, filed on May 7, 2019.

(51) Int. Cl.
*E03C 1/302* (2006.01)
*B08B 9/045* (2006.01)

(52) U.S. Cl.
CPC .............. *E03C 1/302* (2013.01); *B08B 9/045* (2013.01)

(58) Field of Classification Search
CPC ................................ E03C 1/302; B08B 9/045
See application file for complete search history.

(56) References Cited

U.S. PATENT DOCUMENTS

| | | | | |
|---|---|---|---|---|
| 566,110 A * | 8/1896 | Wrigley | E03F 9/005 15/104.33 |
| 984,473 A * | 2/1911 | Cornelius | E03F 9/005 15/104.33 |
| 1,051,992 A | 2/1913 | Fisher et al. | |
| 1,588,737 A | 6/1926 | Hurd | |

(Continued)

FOREIGN PATENT DOCUMENTS

| | | | | |
|---|---|---|---|---|
| AU | 2016262791 A1 * | 6/2018 | |
| CA | 2919494 A1 * | 7/2016 | B08B 9/027 |

(Continued)

OTHER PUBLICATIONS

JP-2680776-B2—English Machine Translation (Year: 1997).*

(Continued)

*Primary Examiner* — Marc Carlson
(74) *Attorney, Agent, or Firm* — The Law Office of Patrick F. O'Reilly III, LLC

(57) ABSTRACT

A drain cleaning device for removing debris from a drain is disclosed herein. In one embodiment, the drain cleaning device includes a handle section, an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements extending from the central core portion, the plurality of protruding elements configured to grab and collect debris from a drain pipe.

19 Claims, 34 Drawing Sheets

(56) References Cited

U.S. PATENT DOCUMENTS

| | | | | | |
|---|---|---|---|---|---|
| 1,783,256 | A * | 12/1930 | Miller | E03C 1/302 | 81/487 |
| 2,717,437 | A | 9/1955 | De Mestral | | |
| 4,123,894 | A | 11/1978 | Hughes et al. | | |
| 4,174,548 | A * | 11/1979 | Dunn | E03F 9/005 | 4/255.11 |
| 5,231,738 | A * | 8/1993 | Higashinaka | A44B 18/0088 | 24/448 |
| 5,423,621 | A * | 6/1995 | Russell | E03C 1/308 | 401/15 |
| 5,669,120 | A * | 9/1997 | Wessels | A44B 18/0088 | 24/445 |
| 5,769,960 | A * | 6/1998 | Nirmel | E03C 1/302 | 15/104.31 |
| 5,836,032 | A * | 11/1998 | Hondo | E03C 1/30 | 15/104.001 |
| 6,065,188 | A * | 5/2000 | Wold | A47J 45/06 | 16/436 |
| 6,131,229 | A * | 10/2000 | Lincuna | B08B 9/0436 | 15/104.31 |
| 6,161,371 | A | 12/2000 | Glesser | | |
| D444,029 | S * | 6/2001 | Wold | D7/395 | |
| 6,775,873 | B2 * | 8/2004 | Luoma | E03C 1/302 | 15/104.001 |
| RE38,652 | E * | 11/2004 | Provost | A44B 18/0061 | 24/442 |
| 6,827,794 | B2 | 12/2004 | Sommerfeld, Sr. | | |
| 6,898,807 | B2 * | 5/2005 | Tash | E03C 1/308 | 4/255.11 |
| D516,244 | S * | 2/2006 | Efthimiadis | D28/48 | |
| 7,584,513 | B2 | 9/2009 | Turner | | |
| 7,810,176 | B2 | 10/2010 | Turner | | |
| 8,359,696 | B1 * | 1/2013 | Turner | B08B 9/045 | 15/104.03 |
| 8,745,771 | B2 * | 6/2014 | Bates | E03C 1/304 | 4/255.04 |
| D784,780 | S * | 4/2017 | Jenkins | D8/107 | |
| 9,670,656 | B2 * | 6/2017 | Rutkowski | F16D 1/112 | |
| 9,945,108 | B1 * | 4/2018 | Turner | B08B 9/045 | |
| 10,047,508 | B2 * | 8/2018 | Elliott | E03C 1/302 | |
| 10,072,405 | B2 * | 9/2018 | Beck | E03C 1/302 | |
| 10,683,648 | B2 * | 6/2020 | Beck | B25G 3/34 | |
| 10,857,577 | B2 * | 12/2020 | Turner | B08B 9/04 | |
| 11,898,338 | B2 | 2/2024 | Turner et al. | | |
| 2002/0125605 | A1 * | 9/2002 | Lacey | A44B 18/0049 | 425/363 |
| 2003/0044569 | A1 | 3/2003 | Kacher et al. | | |
| 2006/0021123 | A1 | 2/2006 | Turner | | |
| 2006/0195994 | A1 * | 9/2006 | Hung | B08B 9/045 | 15/104.095 |
| 2011/0258819 | A1 * | 10/2011 | Cheng | A44B 18/0061 | 24/442 |
| 2012/0005849 | A1 * | 1/2012 | Tash | E03C 1/302 | 15/104.33 |
| 2013/0000680 | A1 * | 1/2013 | Azelton | E03C 1/302 | 134/166 C |
| 2013/0014336 | A1 | 1/2013 | Bernstein | | |
| 2014/0325747 | A1 * | 11/2014 | Gwen | E03C 1/302 | 4/255.01 |
| 2015/0113748 | A1 | 4/2015 | Rutkowski | | |
| 2016/0221050 | A1 * | 8/2016 | Beck | E03C 1/302 | |
| 2017/0130443 | A1 * | 5/2017 | Mills | E03C 1/302 | |
| 2017/0342693 | A1 * | 11/2017 | Tisch | E03C 1/302 | |
| 2018/0066420 | A1 * | 3/2018 | Beck | B25G 1/102 | |
| 2021/0086240 | A1 * | 3/2021 | Turner | B08B 9/04 | |
| 2023/0278079 | A1 * | 9/2023 | Turner | B08B 9/0436 | 15/104.05 |

FOREIGN PATENT DOCUMENTS

| | | | | |
|---|---|---|---|---|
| CA | 2956555 | A1 * | 7/2017 | B08B 9/027 |
| CN | 2490219 | Y | 5/2002 | |
| CN | 101472512 | A * | 7/2009 | A47J 19/005 |
| CN | 103151732 | A | 6/2013 | |
| CN | 107745270 | A * | 3/2018 | B23Q 3/06 |
| CN | 207069443 | U | 3/2018 | |
| DE | 102010023801 | A1 | 12/2011 | |
| EP | 0206566 | A2 * | 12/1986 | |
| FR | 3009007 | A1 * | 1/2015 | E03C 1/302 |
| JP | 2680776 | B2 * | 11/1997 | |
| KR | 20130007178 | U * | 12/2013 | |
| KR | 20190095660 | A * | 8/2019 | |
| WO | WO-2013048088 | A1 * | 4/2013 | A47L 25/00 |

OTHER PUBLICATIONS

PCT Form 210, International Search Report for PCT/US2020/031954, mailed on Jun. 10, 2020.

PCT Form 237, Written Opinion of the International Searching Authority for PCT/US2020/031954, mailed on Jun. 10, 2020.

First office action on the merits from the China National Intellectual Property Administration for Chinese Patent Appl. No. 202080049727.2, issued on Feb. 8, 2023.

Second office action on the merits from the China National Intellectual Property Administration for Chinese Patent Appl. No. 202080049727.2, issued on Nov. 2, 2023.

Third office action on the merits from the China National Intellectual Property Administration for Chinese Patent Appl. No. 202080049727.2, issued on Jul. 10, 2024.

* cited by examiner

Section A-A

FIG. 6
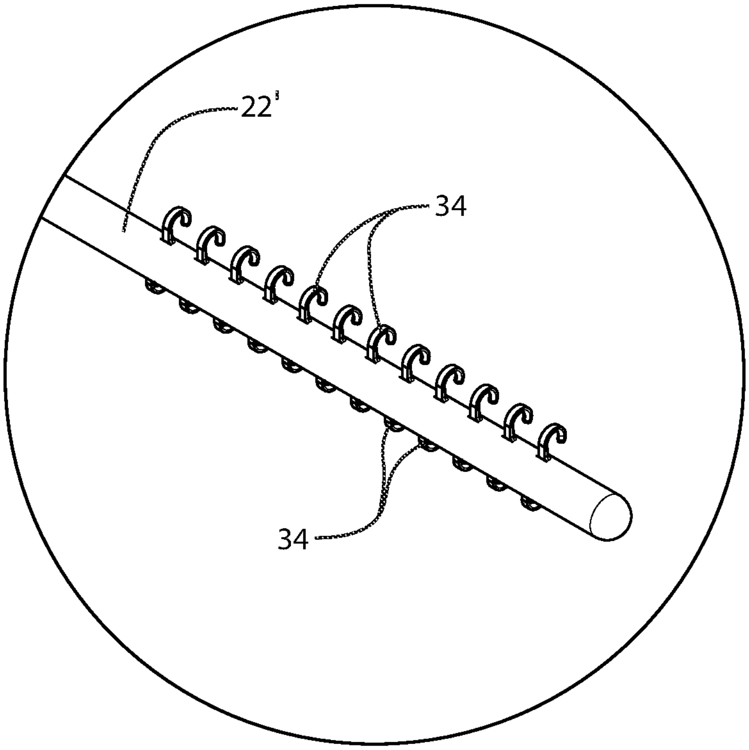
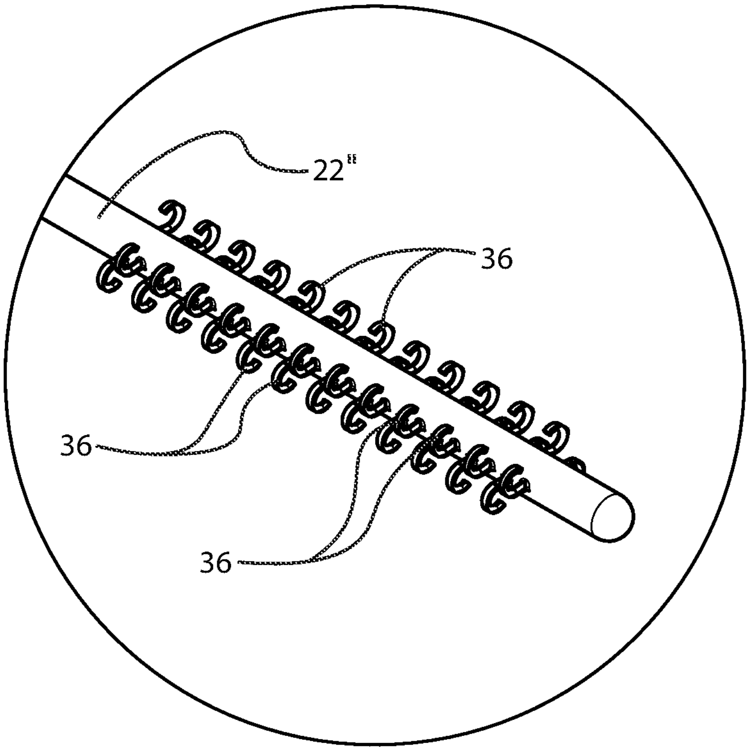
FIG. 7

Section B-B

Detail "A"

Section C-C

Detail "B"

Detail "C"

Detail "D"

Section D-D

DRAIN CLEANING DEVICE

CROSS-REFERENCE TO RELATED APPLICATIONS

This patent application is a continuation-in-part of U.S. Nonprovisional patent application Ser. No. 17/113,678, entitled "Drain Cleaning Device", filed on Dec. 7, 2020; which is a continuation-in-part of U.S. Nonprovisional patent application Ser. No. 16/580,635, entitled "Drain Cleaning Device", filed on Sep. 24, 2019, now U.S. Pat. No. 10,857,577; which claims the benefit of U.S. Provisional Patent Application No. 62/844,458, entitled "Drain Cleaning Device", filed on May 7, 2019, all of the disclosures of which are herein expressly incorporated by reference in their entireties.

U.S. Nonprovisional patent application Ser. No. 17/113,678, entitled "Drain Cleaning Device", filed on Dec. 7, 2020 also is a continuation of International Application No. PCT/US2020/031954, entitled "Drain Cleaning Device", filed on May 7, 2020, which claims priority to U.S. Nonprovisional patent application Ser. No. 16/580,635, entitled "Drain Cleaning Device", filed on Sep. 24, 2019, which claims the benefit of U.S. Provisional Patent Application No. 62/844,458, entitled "Drain Cleaning Device", filed on May 7, 2019, all of the disclosures of which are herein expressly incorporated by reference in their entireties.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a drain cleaning device. More particularly, the invention relates to a drain cleaning device used for cleaning drains by removing hair and other debris that is collected in the upper portion of the drain where stopper or strainer mechanisms and other obstructions occur or collected anywhere along the drain pipe down to the bottom elbow bends of the drain where hair and other debris has collected (e.g., in the drain trap).

2. Background

Bathroom drains are clogged most often by hair that enters the drain and collects from the drain trap at the bottom up to the drain opening. Most frequently, the hair combines with sticky products such as soap, shampoo, and toothpaste and builds a "log-jam" of sorts where these drain obstructions catch the hair, and some settles in the drain trap. After sufficient amounts of hair have collected in the drain trap or around the upper opening, the water from the sink basin begins to drain noticeably more slowly, and eventually can completely block the water from draining. Drain chemicals, home remedies such as baking soda and vinegar and plungers are frequently used for these clogs, but often fail to dissolve or dislodge the hair clogging the drain. In extreme cases, the only remaining remedy is to disassemble the drain or use a device that can effectively reach, snag, and extract the hair (e.g., a drain snake).

Also, liquid or gel-based chemical drain unclogging agents can contain corrosive chemicals that may damage the drain structure. The drain cleaning chemicals may also cause health problems to those who handle the liquids or gels incorrectly. Another problem with chemical agents is that a significant portion of the chemical agent may flow past the hair-clog (for example, in the vertical portion of a bathroom sink drain) such that the chemical cannot effectively submerge the hair in order to completely dissolve it.

Therefore, what is needed is a drain cleaning device for cleaning a bathroom drain or other type of drain that is capable of unblocking the drain of accumulated hair and other debris.

BRIEF SUMMARY OF EMBODIMENTS OF THE INVENTION

Accordingly, the present invention is directed to a drain cleaning device that substantially obviates one or more problems resulting from the limitations and deficiencies of the related art.

In accordance with one or more embodiments of the present invention, there is provided a drain cleaning device for removing debris from a drain. The drain cleaning device comprises a detachable handle section having a proximal end portion and a distal end portion, the distal end portion of the detachable handle section being configured to be coupled to a proximal end portion of a drain cleaning stick. The drain cleaning stick includes an elongated rod section having a first end and a second end oppositely disposed relative to the first end, the first end of the elongated rod section being connected to the detachable handle section; and a tip section connected to the second end of the elongated rod section, the tip section including a central core portion and a plurality of protruding elements integrally formed with the central core portion, the plurality of protruding elements configured to grab and collect debris from the drain pipe.

In a further embodiment of the present invention, the distal end portion of the detachable handle section comprises one or more recesses formed therein that are configured to interlock with one or more corresponding protrusions on the proximal end portion of the drain cleaning stick.

In yet a further embodiment, the drain cleaning device further comprises a sleeve member that is slidable along a length of the detachable handle section between (i) a disengaged position where the drain cleaning stick is able to be released from the detachable handle section, and (ii) an engaged position where the distal end portion of the detachable handle section is locked into engagement with the proximal end portion of the drain cleaning stick.

In still a further embodiment, in the engaged position of the sleeve member, the sleeve member is rotatably disposed about the detachable handle section, the sleeve member configured to be grasped by a hand of a user during the spinning of the drain cleaning device by the user so as to help stabilize the drain cleaning device, the drain cleaning device being configured to be rotated relative to the sleeve member while the sleeve member is held stationary by the hand of the user.

In yet a further embodiment, the distal end portion of the detachable handle section comprises a first partial cylinder section and the proximal end portion of the drain cleaning stick comprises a second partial cylinder section, the first partial cylinder section on the distal end portion of the detachable handle section configured to engage with the second partial cylinder section on the proximal end portion of the drain cleaning stick such that a generally complete cylinder section is formed.

In still a further embodiment, the distal end portion of the detachable handle section is configured to be removably coupled to the proximal end portion of the drain cleaning stick such that the drain cleaning stick is able to be replaced after being used to remove the debris from the drain pipe.

In yet a further embodiment, the drain cleaning stick is configured to be discarded after being used to remove the debris from the drain pipe.

In still a further embodiment, the plurality of protruding elements are in the form of a plurality of injection-molded micro-hook elements.

In yet a further embodiment, at least some of the plurality of injection-molded micro-hook elements are in the form of inverted J-shaped projections protruding outwardly from the central core portion of the tip section of the drain cleaning stick.

In still a further embodiment, at least some of the plurality of injection-molded micro-hook elements are in the form of T-shaped projections protruding outwardly from the central core portion of the tip section of the drain cleaning stick.

In accordance with one or more other embodiments of the present invention, there is provided a drain cleaning device for removing debris from a drain. The drain cleaning device comprises a handle section, the handle section including at least one of: (i) an ergonomic handle body portion configured to fit comfortably into a hand of a user, and (ii) an offset handle portion with a handle segment that is offset relative to a central longitudinal axis of the drain cleaning device, the handle section configured to accommodate the hand of the user during the spinning of the drain cleaning device by the user; an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements extending from the central core portion, the plurality of protruding elements configured to grab and collect debris from the drain pipe.

In a further embodiment of the present invention, the handle section includes the ergonomic handle body portion configured to fit comfortably into the hand of the user, and the ergonomic handle body portion has a partially spherical shape or substantially spherical shape.

In yet a further embodiment, the ergonomic handle body portion with the partially spherical shape or substantially spherical shape has one or more surfaces with a grid-like pattern.

In still a further embodiment, the handle section includes the offset handle portion with the handle segment that is offset relative to the central longitudinal axis of the drain cleaning device, and the handle segment has a segment longitudinal axis that is disposed generally parallel to, and radially offset from the central longitudinal axis of the drain cleaning device.

In yet a further embodiment, the offset handle portion of the handle section is generally U-shaped.

In still a further embodiment, the handle section further comprises a top handle body portion disposed above the offset handle portion, the top handle body portion being substantially wider than a remainder of the handle section so as to fit comfortably into the hand of the user.

In yet a further embodiment, the tip section further comprises an outer covering formed from a hook material strip that is bonded to the central core portion of the tip section that extends from the elongated rod section, the hook material strip comprising the plurality of protruding elements of the tip section.

In still a further embodiment, the plurality of protruding elements are in the form of a plurality of injection-molded micro-hook elements.

In yet a further embodiment, at least some of the plurality of injection-molded micro-hook elements are in the form of inverted J-shaped projections protruding outwardly from the central core portion of the tip section of the drain cleaning device.

In still a further embodiment, at least some of the plurality of injection-molded micro-hook elements are in the form of T-shaped projections protruding outwardly from the central core portion of the tip section of the drain cleaning device.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 6 is a perspective view illustrating a first alternative type of tip section that may be incorporated in the drain cleaning device;

FIG. 7 is a perspective view illustrating a second alternative type of tip section that may be incorporated in the drain cleaning device;

Throughout the figures, the same parts are always denoted using the same reference characters so that, as a general rule, they will only be described once.

DETAILED DESCRIPTION OF EMBODIMENTS OF THE INVENTION

Figure 1:
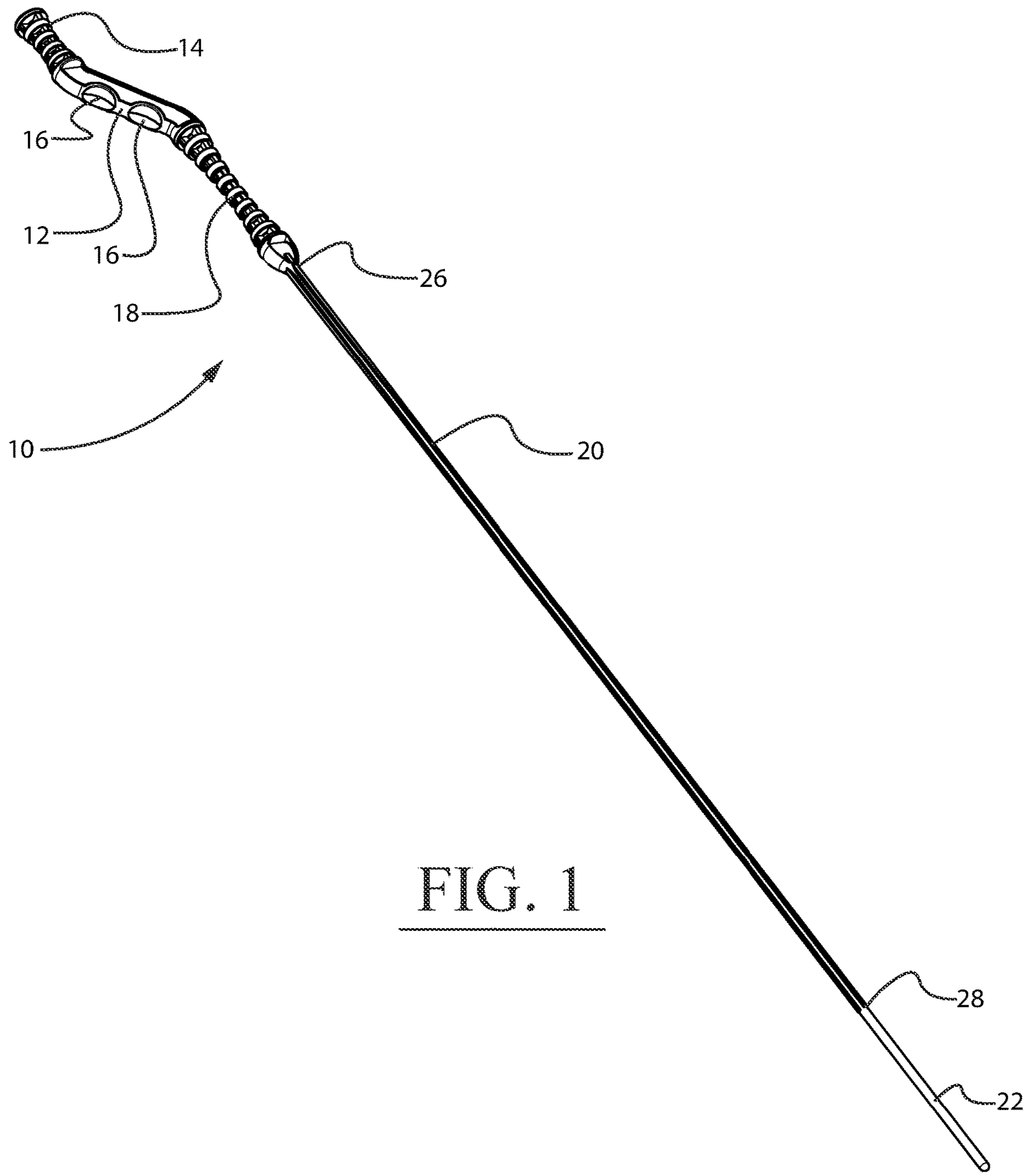
FIG. 1 is a perspective view of a drain cleaning device, according to a first embodiment of the invention.
Figure 2:
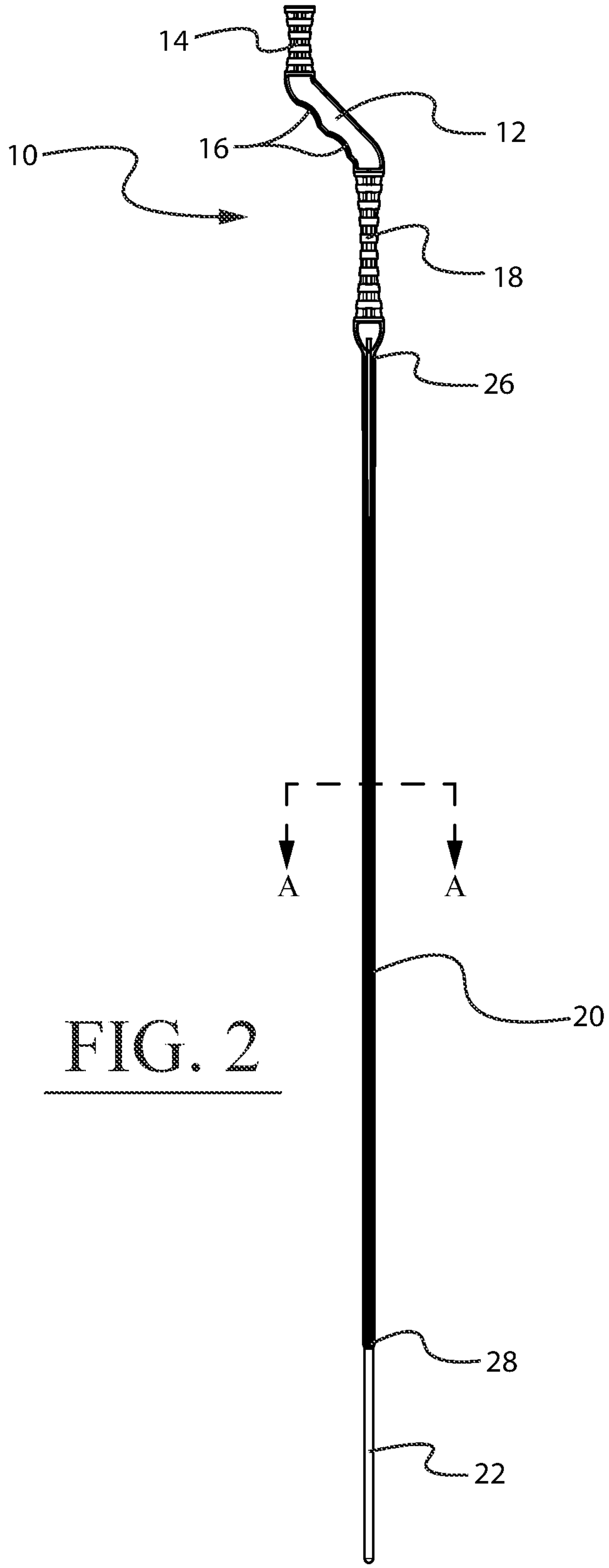
FIG. 2 is a front elevational view of the drain cleaning device of FIG. 1.

An illustrative embodiment of a drain cleaning device is seen generally at 10 in FIGS. 1-2. The drain cleaning device 10 is used for removing debris from a drain (e.g., from the drain pipe 48 of the drain 46 depicted in FIG. 8). With initial reference to FIGS. 1 and 2, it can be seen that the drain cleaning device 10 generally comprises a handle section 12, the handle section 12 including at least one hourglass-shaped portion 14, 18 for facilitating the spinning of the drain cleaning device 10 by a user; an elongated rod section 20 connected to the handle section 12, the elongated rod section 20 including one or more longitudinally extending ribs 24 disposed along a length thereof, the one or more longitudinally extending ribs 24 configured to add structural rigidity to the elongated rod section 20, and the one or more longitudinally extending ribs 24 further configured to facilitate the cleaning of grime from a side of a drain pipe 48 (see FIG. 8); and a tip section 22 connected to the elongated rod section 20, the tip section 22 including a plurality of hook elements 32 disposed thereon (see FIG. 5), the plurality of hook elements 32 configured to grab and collect debris from the drain pipe 48.

In the illustrative embodiment, with combined reference to FIGS. 1 and 2, it can be seen that the at least one hourglass-shaped portion 14, 18 of the handle section 12 comprises an upper hourglass-shaped portion 14 and a lower hourglass-shaped portion 18. The upper hourglass-shaped portion 14 is configured to accommodate a first hand 38 of a user during the spinning of the drain cleaning device 10 by the user (see FIG. 8). The lower hourglass-shaped portion 18 is configured to accommodate a second hand 40 of the user during the spinning of the drain cleaning device 10 by the user. In the illustrative embodiment, the handle section 12 further comprises a diagonal handle portion connecting the upper hourglass-shaped portion 14 to the lower hourglass-shaped portion 18. As shown in the illustrative embodiment of FIGS. 1 and 2, the diagonal handle portion comprises a pair of finger concave recesses or indentations 16 for accommodating fingers of the user when the drain cleaning device 10 is being inserted into, and removed from the drain pipe 48 (see FIG. 8).

Advantageously, the hourglass-shaped portions 14, 18 on the handle section 12 allow a user to spin the device 10 comfortably. In the illustrative embodiment, one hand 38 is placed on the upper hourglass-shaped portion 14, and the other hand 40 on the lower hourglass-shaped portion 18 to spin the device 10. Spinning action is important to dislodging hair clogs that accumulate in the drain (and get wrapped around drain parts, like the stopper). The finger recesses 16 are used for pushing and pulling the device 10 up and down within the drain. The up and down movement is used for pushing the device 10 further into the drain, or pulling the clog up and out of the drain.

Figure 4:
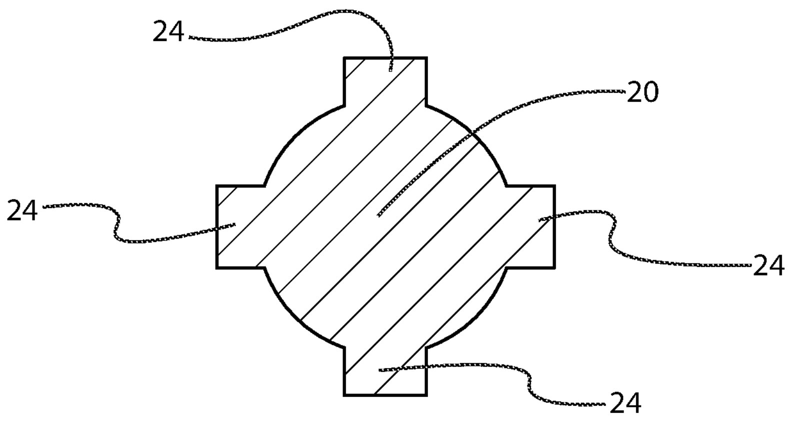
FIG. 4 is a transverse sectional view cut through the elongated rod section of the drain cleaning device of FIG. 1, wherein the section is generally cut along the cutting-plane line A-A in FIG. 2.

In the illustrative embodiment, as shown in FIGS. 1, 2, and 4, the one or more longitudinally extending ribs 24 of the elongated rod section 20 comprise a plurality of longitudinally extending ribs 24 that are circumferentially spaced apart from one another about a periphery of the elongated rod section 20 (e.g., four (4) ribs 24 spaced ninety degrees apart from one another about the circumference of the elongated rod section 20). The plurality of longitudinally extending ribs 24 are configured to add structural rigidity to the elongated rod section 20. Also, the plurality of longitudinally extending ribs 24 further are configured to facilitate the cleaning of grime from the side of the drain pipe 48 (see FIG. 8).

In the illustrative embodiment, the ribs 24 extend horizontally down the elongated rod section 20. The ribs 24 are tapered starting at the first end 26 of the elongated rod section 20 (e.g., starting at an approximately 3/16" diameter) and taper down to a smaller diameter at the second end 28 of the elongated rod section 20 (e.g., ending at an approximately 1/8" diameter). The ribs 24 add rigidity to the elongated rod section 20 of the device 10. Without the ribs 24, the small diameter portion of the device 10 would be flimsy, and would not have the required stiffness to manipulate the drain. When the device 10 is spinned by a user, the ribs 24 can also act as a brush that clears grime from the sides of the drain pipe. At the end of the ribs 24 is yet another tapered area. This distal tapered area is important for helping the device 10 maneuver over pipe joints. This tapered area also acts as a ledge so that the edge of the hook material strip 30 (e.g., made from the hook portion of Velcro®) does not get caught on drain parts when pulling the device 10 up and out of the drain.

Figure 5:
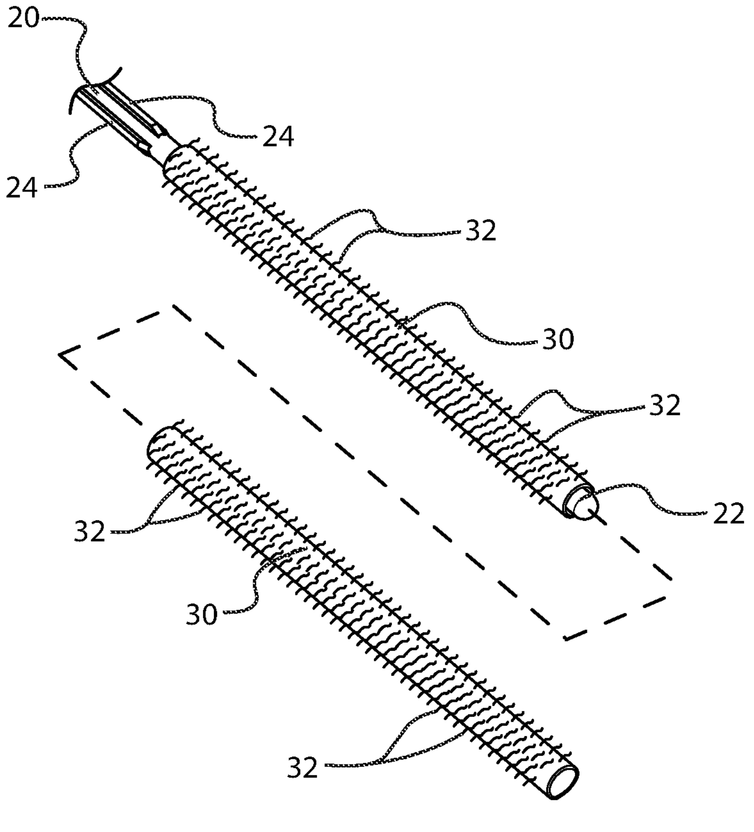
FIG. 5 is a perspective view illustrating the manner in which a hook material strip is inserted on the tip section of the drain cleaning device of FIG. 1.

Now, referring to FIGS. 5-7 and 9-11, the different types of tip sections 22, 22', 22", 22'", 22"" that may be used with the illustrative drain cleaning device 10 will be described. Initially, as shown in FIG. 5, the first type of tip section 22 may comprise an outer covering formed from a hook material strip 30 that is bonded to a core portion of the tip section 22 that extends from the elongated rod section 20. With the first type of tip section 22, the hook material strip 30 comprises the plurality of hook elements 32 of the tip section 22. As shown in FIG. 5, the rolled hook material strip 30 may be slipped over the core portion of the tip section 22, and bonded to the core portion of the tip section 22 using a suitable adhesive or glue (e.g., a two-part epoxy). Turning to FIGS. 6 and 7, in the second and third types of tip sections 22', 22", the plurality of hook elements 34, 36 are integrally formed in the tip section 22', 22" of the drain cleaning device 10. As shown in FIGS. 6 and 7, the plurality of hook elements 34, 36 are in the form of inverted J-shaped projections protruding outwardly from the tip section 22', 22" of the drain cleaning device 10. Also, it can be seen in FIGS. 6 and 7 that the plurality of hook elements 34, 36 are disposed on opposite first and second sides of the core portion of the tip section 22', 22" of the drain cleaning device 10. In the embodiment of FIG. 6, only a single row of hook elements 34 is provided on each side of the core portion of the tip section 22', whereas, in the embodiment of FIG. 7, two rows of hook elements 36 are provided on each side of the core portion of the tip section 22". Also, in the FIG. 7 embodiment, the plurality of hook elements 36 that are disposed on the first side and the second side of the core portion of the tip section 22" are arranged in a staggered pattern. In addition, in the FIG. 7 embodiment, the plurality of hook elements 36 that are disposed on the first side and the second side of the core portion of the tip section 22" comprise two rows of hook elements with free ends that point in generally opposite directions. Finally, referring to FIG. 9, in the fourth type of tip section 22'", the core portion of the tip section 22'" further comprises a mushroom-shaped cap 33 disposed on a distal end thereof. The mushroom-shaped cap 33 is configured to prevent the hook material strip 30 from being pulled off the core portion of the tip section 22'" when the drain cleaning device 10 is being removed from the drain pipe 48 by the user. Like the first type of tip section 22 depicted in FIG. 5, the fourth type of tip section 22'" in FIG. 9 comprises an outer covering formed from a hook material strip 30 (e.g., made from the hook portion of Velcro®) that is bonded to a core portion of the tip section 22'".

Figure 10:
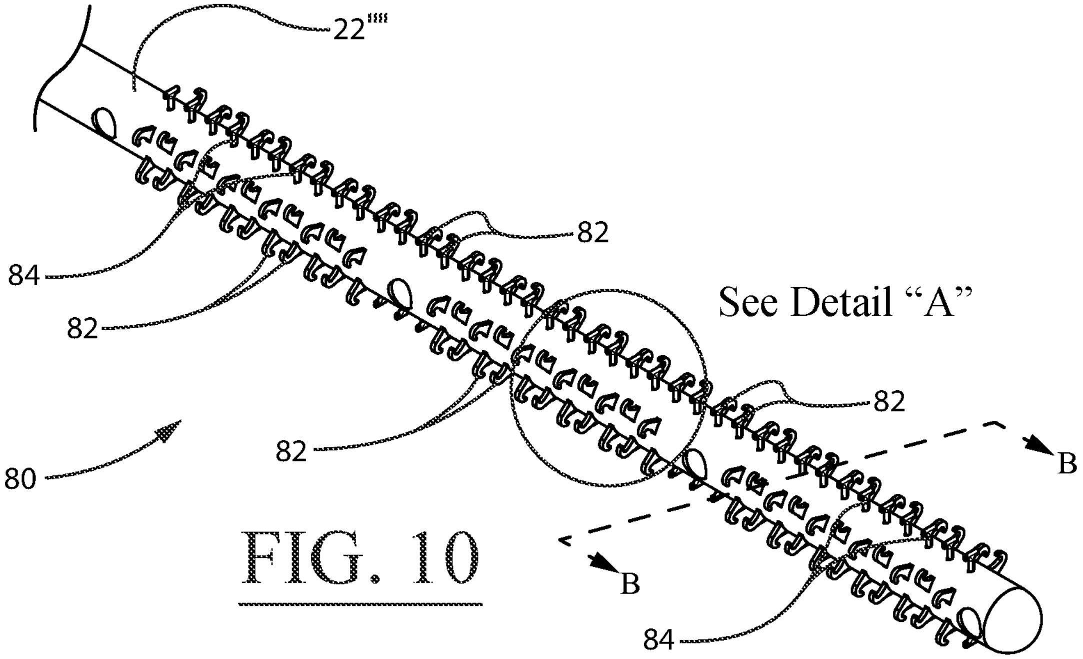
FIG. 10 is a perspective view illustrating a fourth alternative type of tip section that may be incorporated in the drain cleaning device.
Figure 11:
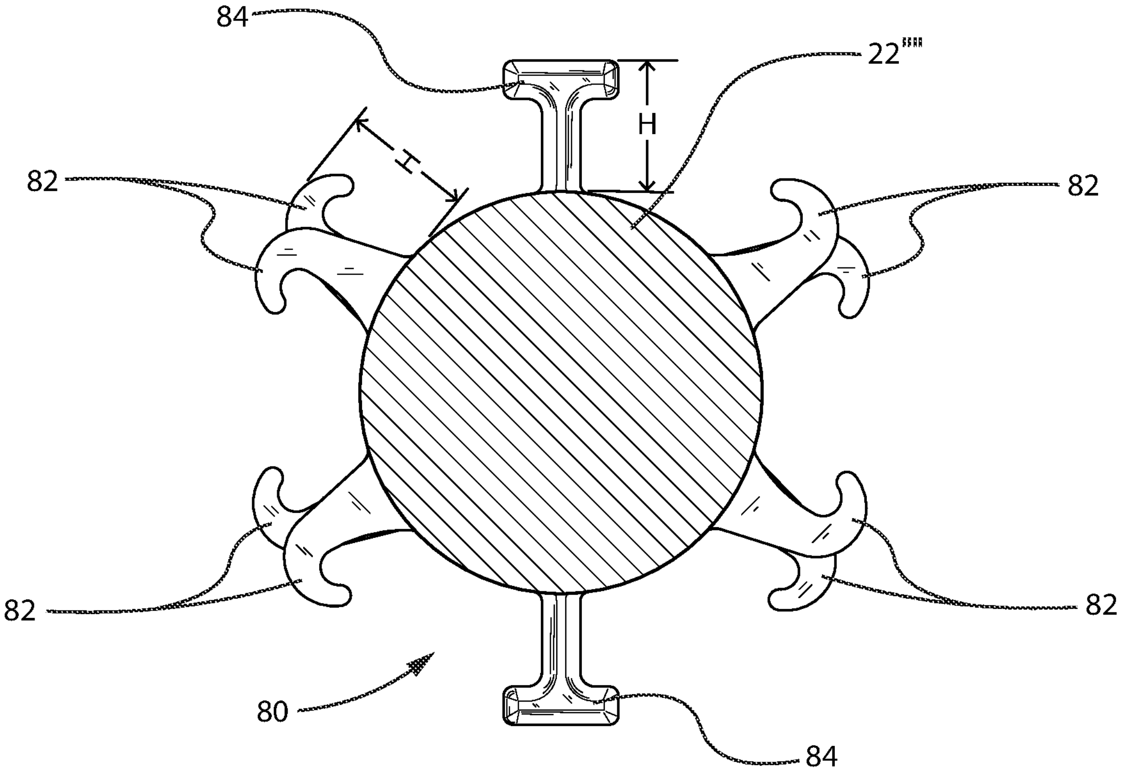
FIG. 11 is a transverse sectional view cut through the fourth alternative type of tip section of FIG. 10, wherein the section is generally cut along the cutting-plane line B-B in FIG. 10.

A fifth type of tip section 22"" that may be used with the illustrative drain cleaning device 10, 80 will be described with reference to FIGS. 10 and 11. As shown in these figures, similar to the second and third types of tip sections 22', 22" described above, the plurality of hook elements 82, 84 are integrally formed in the fifth type of tip section 22"" of the drain cleaning device 80. More specifically, in the fifth type of tip section 22"", the plurality of hook elements 82, 84 are in the form of injection-molded micro-hook elements configured to grab and collect debris from a drain pipe (e.g., from the drain pipe 48 depicted in FIG. 8). The other components of the drain cleaning device 10, 80 that includes the tip section 22"" are the same as that described above with regard to FIG. 1, and thus, a discussion of these components will not be repeated here. As shown in FIGS. 10 and 11, the plurality of injection-molded micro-hook elements 82, 84 are in the form of inverted J-shaped projections 82 and T-shaped projections 84 protruding outwardly from the tip section 22"" of the drain cleaning device 80. Also, it can be seen in FIGS. 10 and 11 that the plurality of injection-molded micro-hook elements 82, 84 are disposed on opposite first and second sides of the core portion of the tip section 22"" of the drain cleaning device 80. In the embodiment of FIGS. 10 and 11, two rows of injection-molded micro-hook inverted J-shaped elements 82 are provided on each side of the core portion of the tip section 22"", while one row of injection-molded micro-hook T-shaped elements 84 is provided on each of the top and bottom of the core portion of the tip section 22"". Also, as shown in FIGS. 10 and 11, the injection-molded micro-hook inverted J-shaped elements 82 that are disposed on the first side and the second side of the core portion of the tip section 22"" are arranged in rows where every other injection-molded micro-hook element 82 points in an opposite direction (i.e., the injection-molded micro-hook elements 82 point in alternating directions along the length of tip section 22""). In addition, in the embodiment of FIGS. 10 and 11, the injection-molded micro-hook inverted J-shaped elements 82 that are disposed on the first side and the second side of the core portion of the tip section 22"" comprise two rows of micro-hook elements with free ends that point in generally opposite directions (see the sectional view of FIG. 11).

In the illustrative embodiment of FIGS. 10 and 11, the tip section 22"" comprises a tip body portion with a circular cross-section. As shown in FIGS. 10 and 11, the plurality of injection-molded micro-hook elements 82, 84 are arranged in circumferentially spaced-apart rows on the tip body portion (see FIG. 11). In the illustrative embodiment, each of the circumferentially spaced-apart rows comprises a subset of the injection-molded micro-hook elements 82, 84 arranged in generally linear pattern (see FIGS. 10 and 11) on the narrow, circular shaft of the tip body portion. In the illustrative embodiment, the circular shaft of the tip body portion in FIGS. 10 and 11 may have a diameter in the range between approximately 3.25 millimeters and approximately 4.25 millimeters, inclusive (or a diameter between 3.25 millimeters and 4.25 millimeters, inclusive). For example, in the illustrative embodiment, the circular shaft of the tip body portion may have a diameter of approximately 4.05 millimeters. In another embodiment, the injection-molded micro-hook elements 82, 84 may be provided on a flat strip of material that forms a part of a drain cleaning device, rather than the circular shaft of the tip body portion depicted in FIGS. 10 and 11.

In the illustrative embodiment, as shown in FIGS. 10 and 11, the tip section 22"" comprises a total of six (6) circumferentially spaced-apart rows of the injection-molded micro-hook elements 82, 84 (i.e., four (4) rows of the injection-molded micro-hook inverted J-shaped elements 82, and two (2) rows of the injection-molded micro-hook T-shaped elements 84). In the illustrative embodiment, there may be approximately forty (40) injection-molded micro-hook elements 82, 84 in each row, wherein each row may have a length of approximately 2.75 inches. As such, in the illustrative embodiment, a total of approximately two-hundred and forty (240) injection-molded micro-hook elements 82, 84 may located in a small 2.75-inch section of the drain cleaning device 80.

In the illustrative embodiment, the injection-molded micro-hook elements 82, 84 may have a thickness T (see FIG. 12) between approximately 0.25 millimeters and approximately 0.50 millimeters, inclusive (or a thickness between 0.25 millimeters and 0.50 millimeters, inclusive). For example, in the illustrative embodiment, the injection-molded micro-hook elements 82, 84 may have a thickness of approximately 0.27 millimeters. Also, in the illustrative embodiment, the injection-molded micro-hook elements 82, 84 may have a height H (see FIG. 11) between approximately 1.5 millimeters and approximately 2.0 millimeters, inclusive (or a height between 1.5 millimeters and 2.0 millimeters, inclusive). For example, in the illustrative embodiment, the injection-molded micro-hook elements 82, 84 may have a height of approximately 1.73 millimeters.

Figure 3:
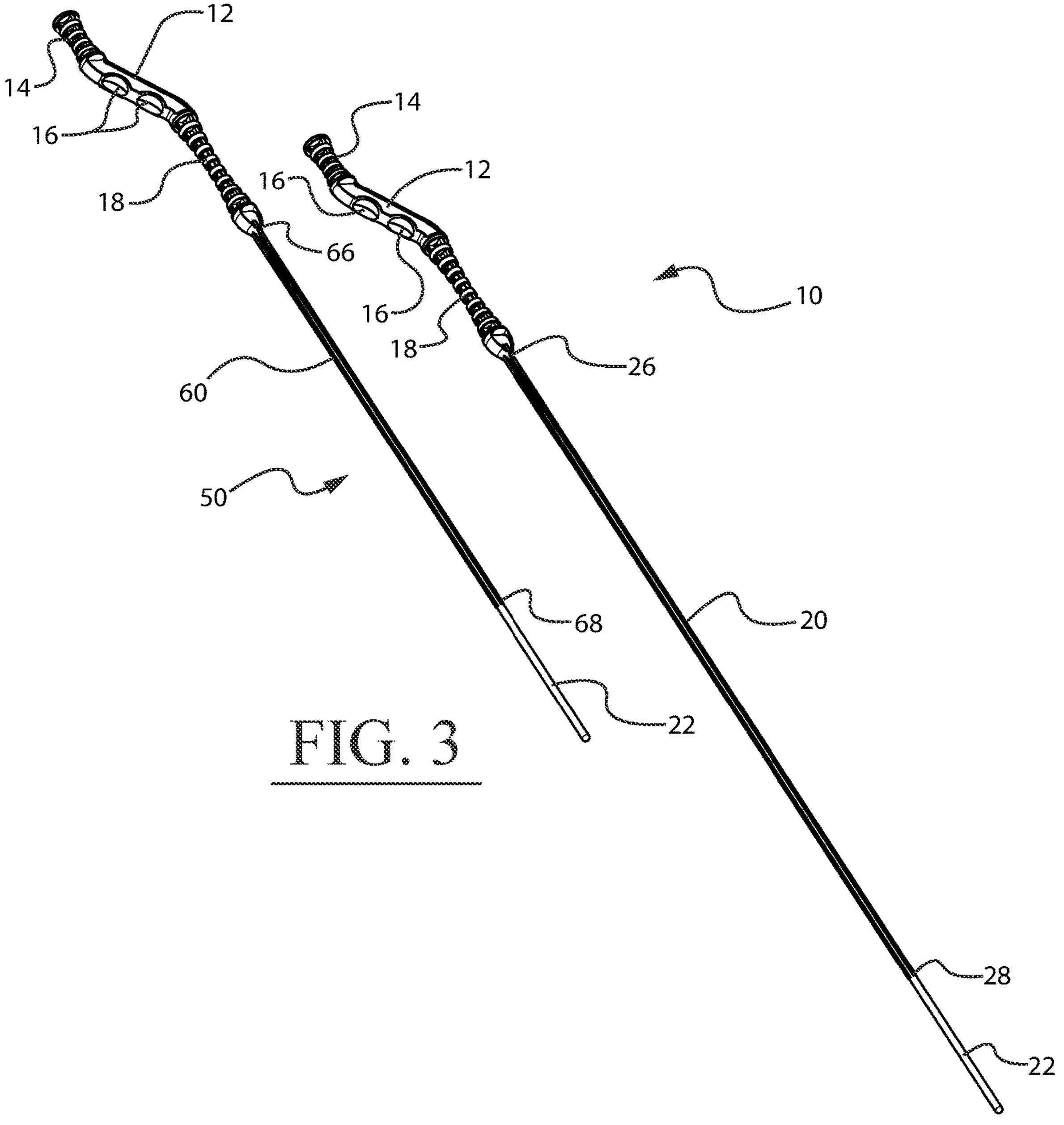
FIG. 3 is a perspective view of the drain cleaning device of FIG. 1 depicted next to a second embodiment of the drain cleaning device.

In the illustrative embodiment, the injection mold for the device 10, 80 may be designed with interchangeable inserts. The inserts are installed into the mold and allow the device 10, 80 to be mass-produced in different styles without having to make new mold for each style of device 10, 80. For example, one mold insert will produce a round end on the device 10 (so that the hook material strip 30 may be bonded to the tip section). A different insert could be installed in the mold for molding plastic barbs or hooks on the end (e.g., as shown in FIGS. 6 and 7). Also, the inserts can be different lengths so that a 12" long shaft (see device 50 on the left side in FIG. 3) or an 18" long shaft (see device 10 on the right side in FIG. 3) can be produced using the same mold. In FIG. 3, the drain cleaning device 50 is generally the same as the drain cleaning device 10, except that the length of the elongated rod section 60 between ends 66, 68 is shorter than the length of the elongated rod section 20 between ends 26, 28.

Figure 8:
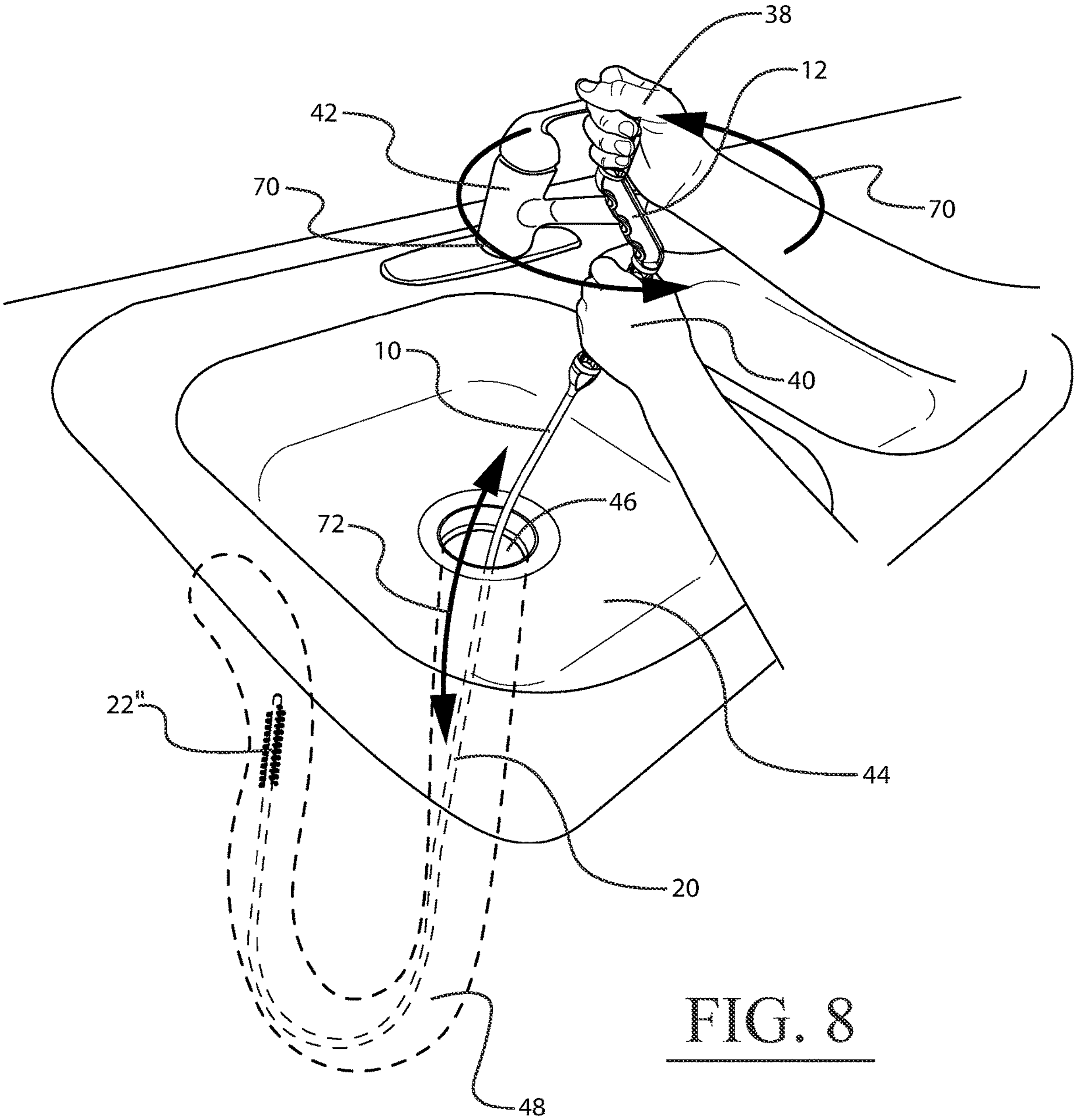
FIG. 8 is a perspective view illustrating the manner in which the drain cleaning device of FIG. 1 may be used to clean a drain pipe of a sink drain.
Figure 9:
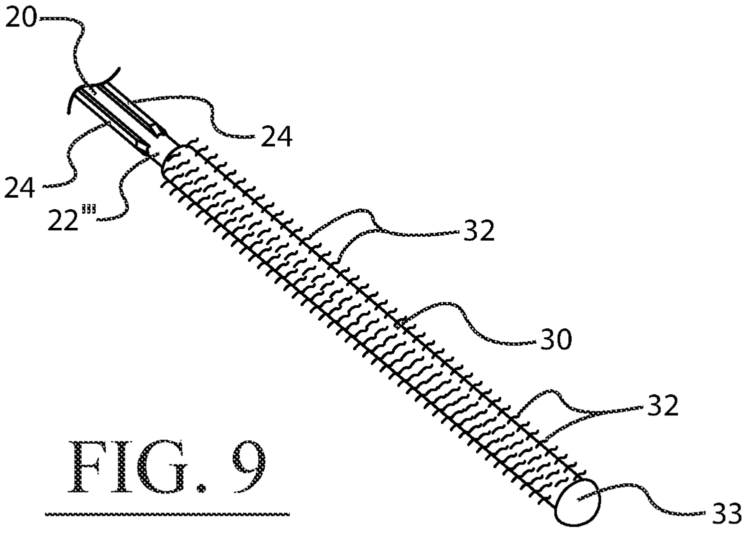
FIG. 9 is a perspective view illustrating a third alternative type of tip section that may be incorporated in the drain cleaning device.

In FIG. 8, the operation of the drain cleaning device 10 is illustrated. More specifically, FIG. 8 shows the inventive drain cleaning device 10 being used in a kitchen sink 44 to remove clogging debris from the drain pipe 48 of the sink 44. The kitchen sink 44 has an associated kitchen faucet 42 for dispensing water into the sink 44. In the illustrative embodiment, the diameter of the elongated rod section 20 of the device 10 is sufficiently narrow to be easily inserted through openings in a typical drain cover all the way to the drain trap, often found in older residential bathrooms or modern drains having pop-up stoppers. Referring again to FIG. 8, after insertion of the elongated rod section 20 into the drain 46 (as diagrammatically indicated by downwardly directed arrow 72), the handle section 12 is rotated (as diagrammatically indicated by curved arrows 70), thus winding into and capturing the clogging debris. The particular construction of the hook surface of the hook material strip 30, and of the tip section 22, allows the debris to be collected and grabbed by the drain cleaning device 10. After grabbing the clogging debris, the device 10 is removed from the drain 46 (as diagrammatically indicated by upwardly directed arrow 72).

In one or more embodiments, the entire drain cleaning device 10, 80 is configured to be discarded after being used to remove the debris from the drain pipe 48. In other words, the drain cleaning device 10, 80 is disposable, and is designed for single cleaning of a drain. The used drain cleaning device 10, 80 with the collected debris can be safely and environmentally discarded. Then, a new drain cleaning device 10, 80 can be used to remove hair from another clogged drain.

Another illustrative embodiment of the drain cleaning device is seen generally at 10' in FIGS. 13-18. Referring to these figures, it can be seen that, in many respects, the illustrative embodiment of FIGS. 13-18 is similar to that of the illustrative embodiment of FIGS. 1-2. Moreover, many elements are common to both such embodiments. For the sake of brevity, the elements that the illustrative embodiment of FIGS. 13-18 has in common with the embodiment of FIGS. 1-2 will not be discussed in detail because these components have already been described above.

Like drain cleaning device 10 described above, the drain cleaning device 10' of the illustrative embodiment of FIGS. 13-18 generally comprises a handle section 12', the handle section 12' including at least one hourglass-shaped portion 14', 18' for facilitating the spinning of the drain cleaning device 10' by a user; an elongated rod section 20' connected to the handle section 12'; and a tip section 22"" connected to the elongated rod section 20', the tip section 22"" including a plurality of hook elements 82, 84 disposed thereon (see FIG. 10), the plurality of hook elements 82, 84 configured to grab and collect debris from a drain pipe. Similar to the drain cleaning device 10 described above, the drain cleaning device 10' is used for removing debris from a drain (e.g., from the drain pipe 48 of the drain 46 depicted in FIG. 8).

Figure 13:
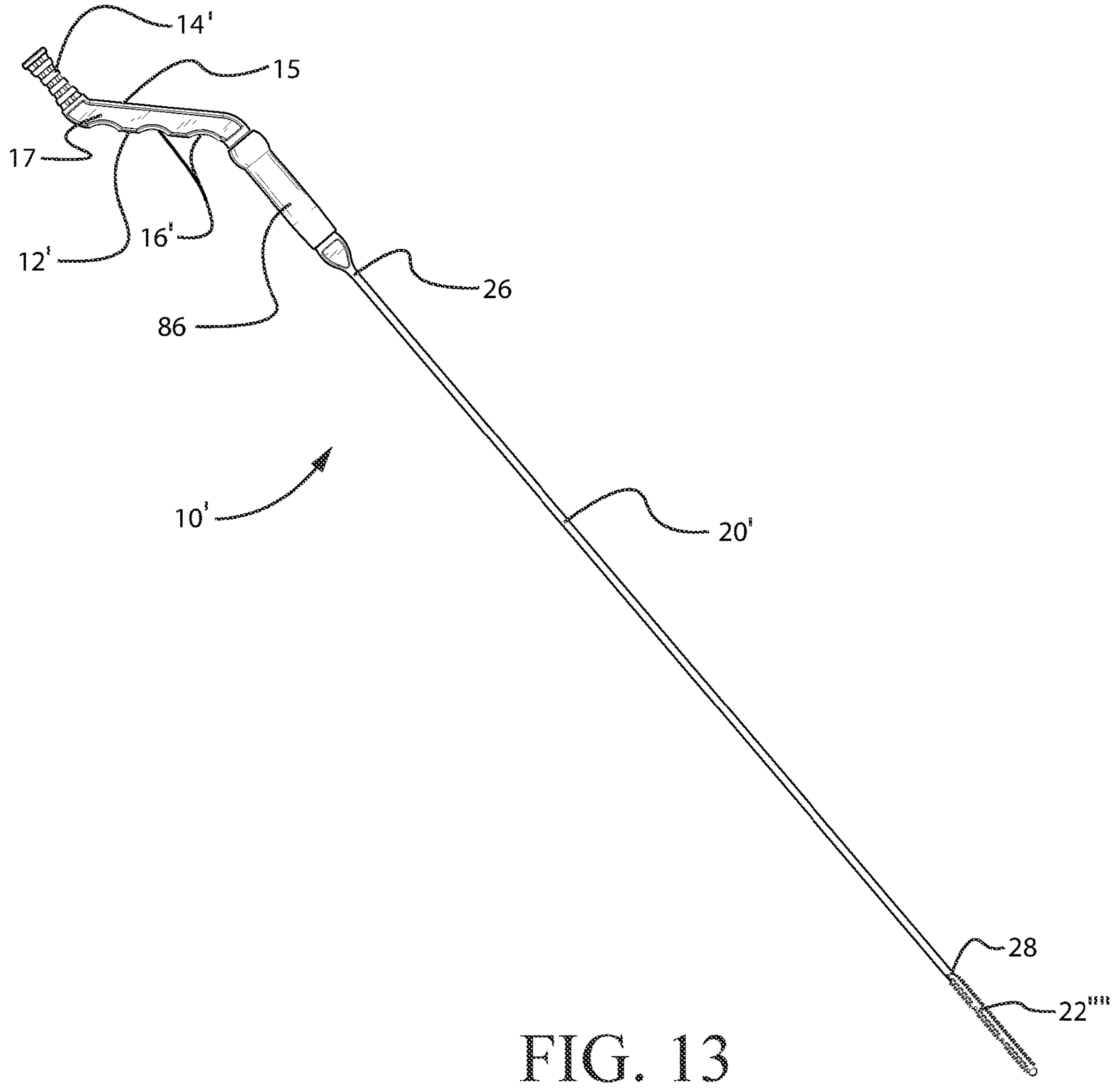
FIG. 13 is a perspective view of a drain cleaning device, according to a third embodiment of the invention.
Figure 14:
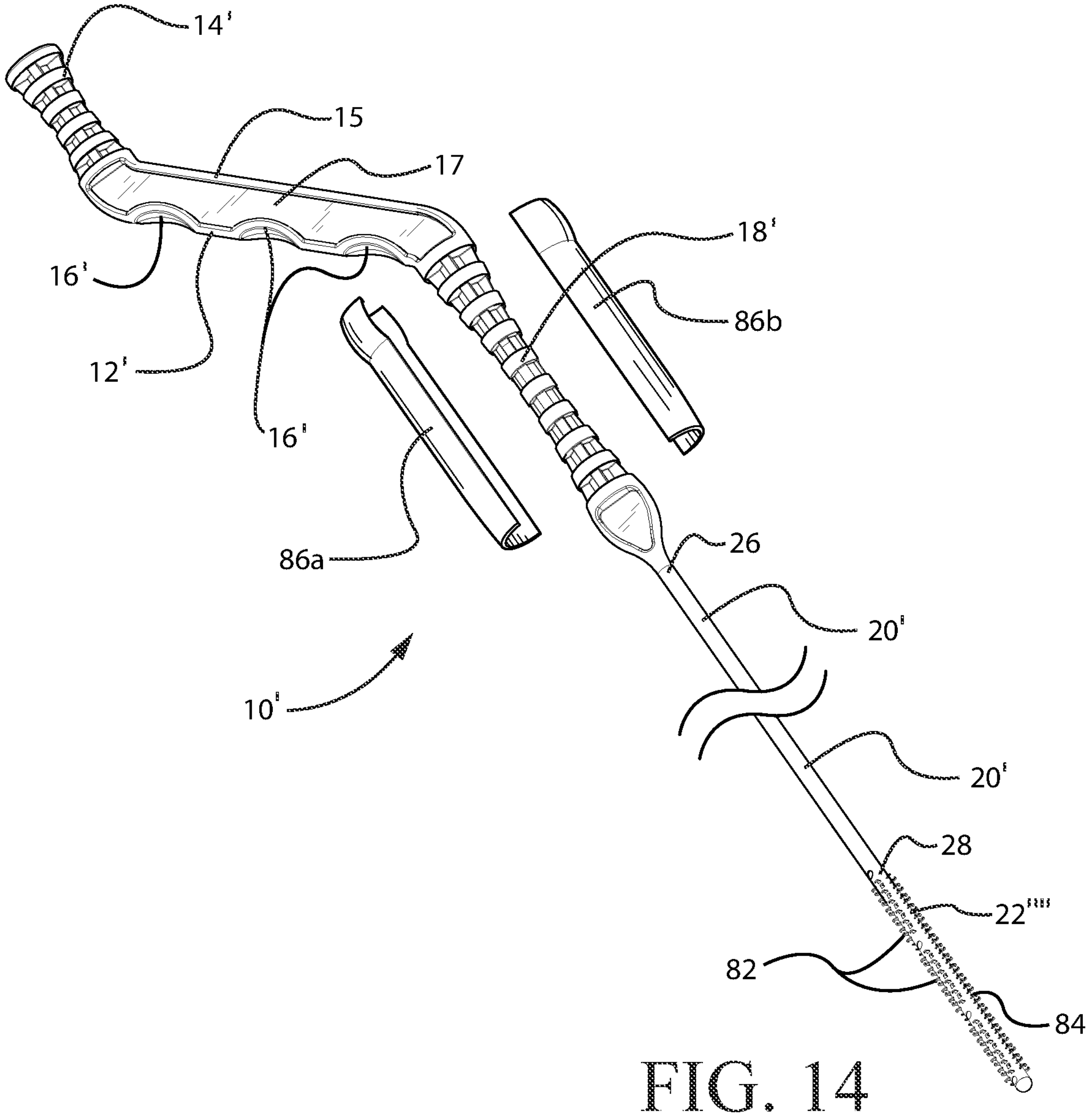
FIG. 14 is a partial enlarged perspective view of the drain cleaning device of FIG. 13, wherein the sleeve member is shown exploded from the remainder of the handle section.
Figure 15:
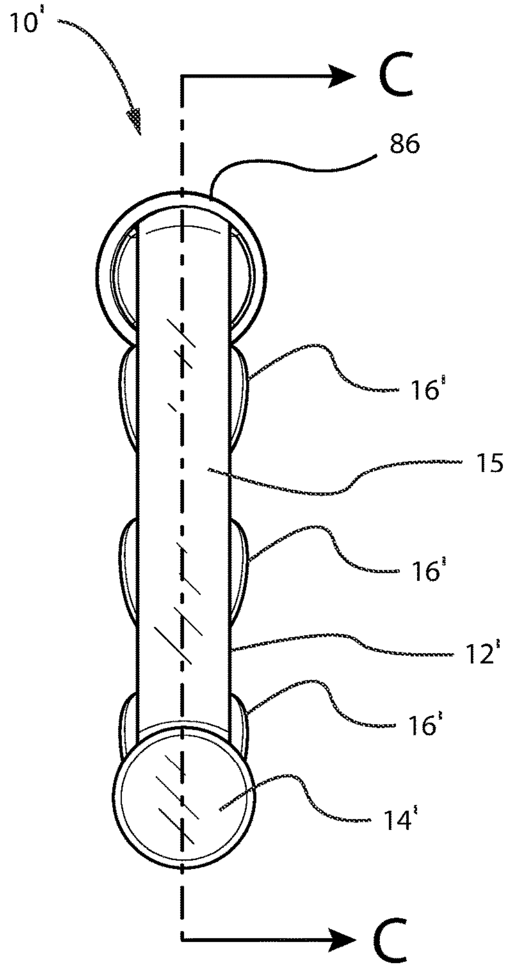
FIG. 15 is a top plan view of the drain cleaning device of FIG. 13.

In the illustrative embodiment of FIGS. 13-18, with combined reference to FIGS. 13 and 14, it can be seen that the at least one hourglass-shaped portion 14', 18' of the handle section 12' comprises an upper hourglass-shaped portion 14' and a lower hourglass-shaped portion 18'. Also, in this illustrative embodiment, a sleeve member 86 is rotatably disposed on the lower hourglass-shaped portion 18' (see FIGS. 13 and 16). In the illustrative embodiment, as shown in FIG. 14, the sleeve member 86 is formed from two half sections 86*a*, 86*b*, and the sleeve member 86 may be attached to the lower hourglass-shaped portion 18' of the handle section 12' by gluing or ultrasonically welding the two half sections 86*a*, 86*b* of the sleeve member 86 together. Further, in the illustrative embodiment, the upper hourglass-shaped portion 14' is configured to accommodate a first hand 38 of a user during the spinning of the drain cleaning device 10' by the user (see FIG. 18). The sleeve member 86 on the lower hourglass-shaped portion 18' is configured to accommodate a second hand 40 of the user during the spinning of the drain cleaning device 10' by the user. As best shown in the sectional view of FIG. 17, the upper and lower ends of the sleeve member 86 are respectively received with the upper and lower grooves 90, 96. The sleeve member 86 is able to rotate within the grooves 90, 96, but is axially constrained by the bounding edges of the grooves 90, 96 so that the sleeve member 86 is unable to slide up or down the device 10' after it is attached in place on the lower hourglass-shaped portion 18'. For example, the upper rib 92 of the lower hourglass-shaped portion 18' prevents the sleeve member 86 from sliding downwardly, while the lower rib 94 of the lower hourglass-shaped portion 18' prevents the sleeve member 86 from sliding upwardly.

Figure 16:
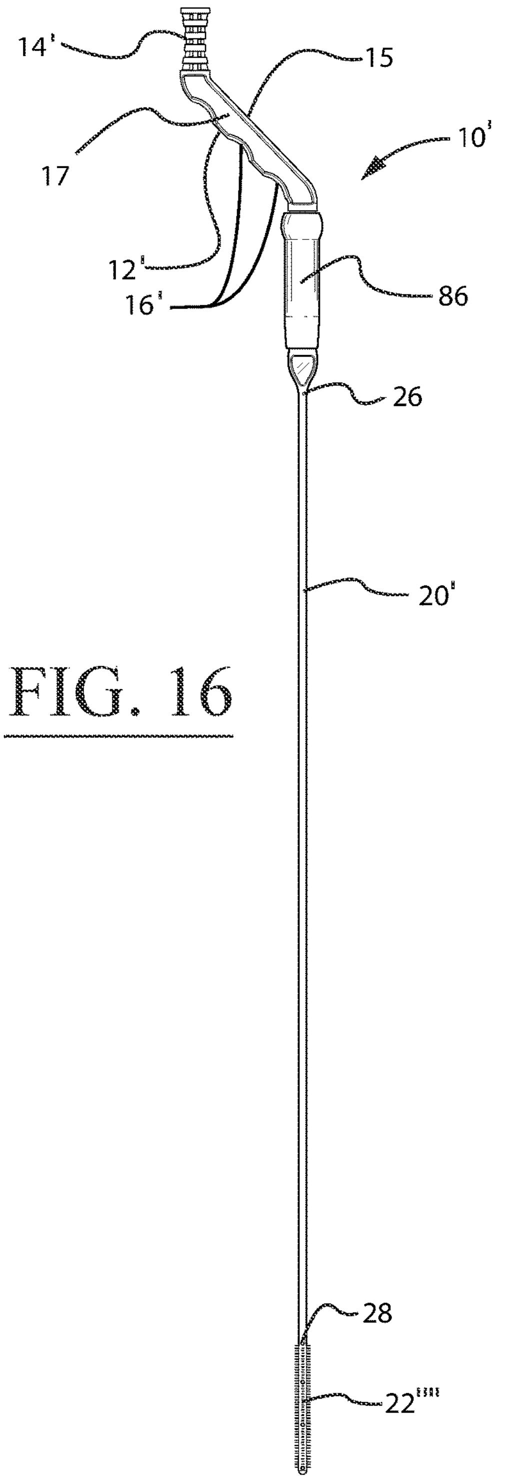
FIG. 16 is a front elevational view of the drain cleaning device of FIG. 13.
Figure 17:
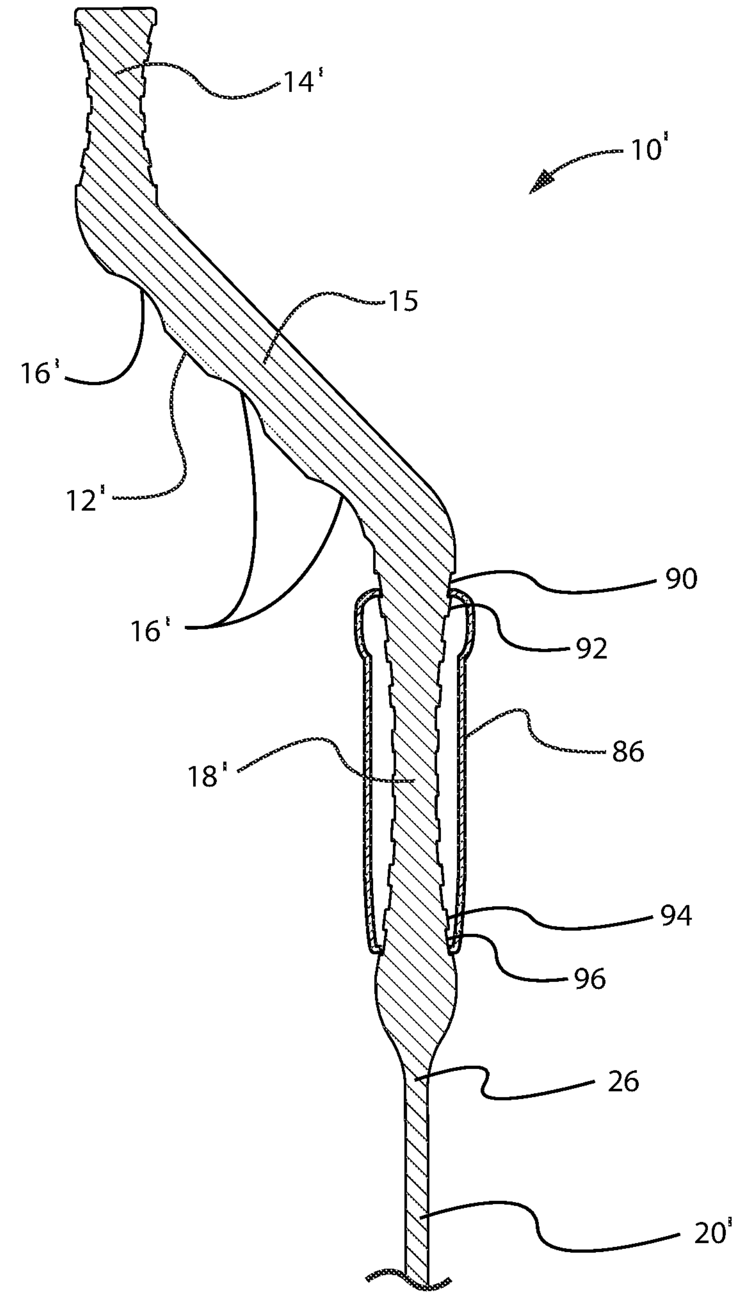
FIG. 17 is an enlarged longitudinal sectional view cut through the handle section of the drain cleaning device of FIG. 13, wherein the section is generally cut along the cutting-plane line C-C in FIG. 15.

As shown in FIGS. 13, 14, and 16, in the illustrative embodiment, the handle section 12' further comprises a diagonal handle portion 15 connecting the upper hourglass-shaped portion 14' to the lower hourglass-shaped portion 18'. As shown in the illustrative embodiment of FIGS. 13, 14, and 16, the diagonal handle portion 15 comprises a plurality of finger concave recesses or indentations 16' for accommodating fingers of the user when the drain cleaning device 10' is being inserted into, and removed from the drain pipe 48 (see FIG. 8). Also, as shown in FIGS. 13, 14, and 16, the diagonal handle portion 15 has a recess 17 formed therein that extends between the upper hourglass-shaped portion 14' and the lower hourglass-shaped portion 18'. In the illustrative embodiment, it can be seen that the recess 17 of the diagonal handle portion 15 has a flat bottom wall (see FIGS. 13, 14, and 16). Advantageously, the recess 17 with the flat bottom wall facilitates the grasping of the drain cleaning device 10' as it is pulled out of a drain by a user.

Figure 18:
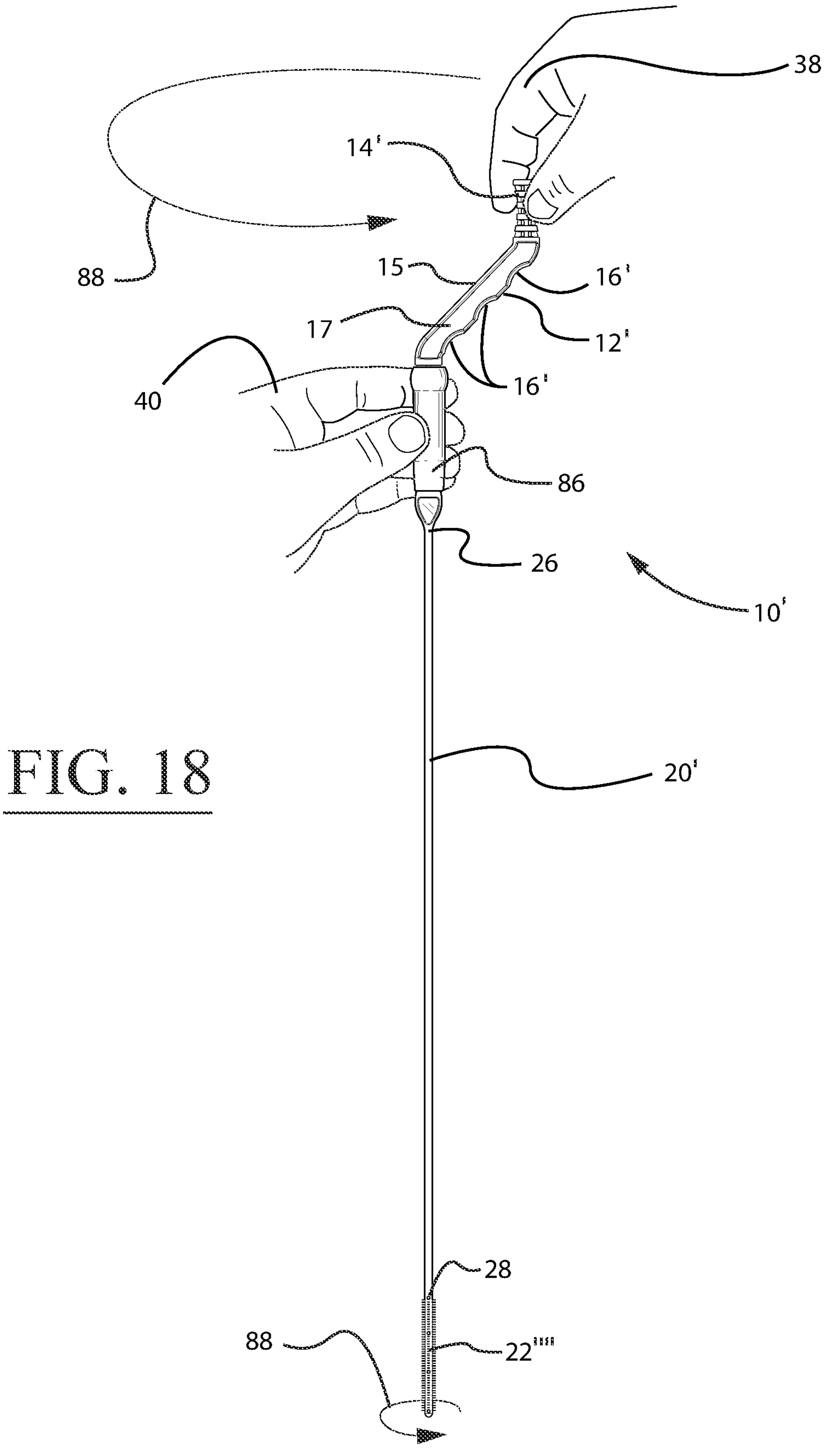
FIG. 18 is another front elevational view of the drain cleaning device of FIG. 13 illustrating the manner in which the drain cleaning device is able to be rotated by a user.

Advantageously, as illustrated in FIG. 18, the upper hourglass-shaped portion 14' and the sleeve member 86 on the handle section 12' allow a user to spin the drain cleaning device 10' comfortably (the rotation of the device 10' is diagrammatically indicated by the curved arrow 88 in FIG. 18). In the illustrative embodiment, one hand 38 is placed on the upper hourglass-shaped portion 14', and the other hand 40 on the sleeve member 86 (for holding the sleeve member 86 stationary relative to portion 18' that is rotating) so as to spin the device 10' in a 360-degree manner without the need to release the handle when unclogging a drain. Spinning action is important to dislodging hair clogs that accumulate in the drain (and get wrapped around drain parts, like the stopper). The finger recesses 16' are used for pushing and pulling the device 10' up and down within the drain. The up and down movement is used for pushing the device 10' further into the drain, or pulling the clog up and out of the drain.

Figure 12:
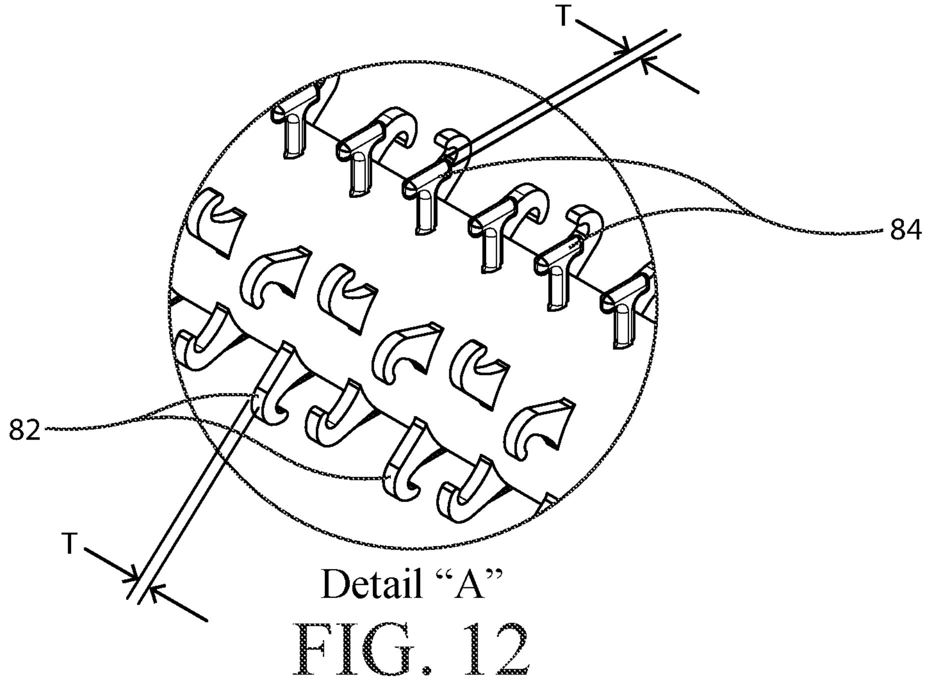
FIG. 12 is an enlarged view of a portion of the tip section in FIG. 10, wherein the hook elements of the tip section are illustrated in more detail (Detail "A")

In the illustrative embodiment of FIGS. 13-18, with particular reference to FIGS. 13, 14, and 16, the tip section 22"" of the drain cleaning device 10' comprises the combination of injection-molded micro-hook inverted J-shaped elements 82 and injection-molded micro-hook T-shaped elements 84 that were described above in detail with reference to the device 80 of FIGS. 10-12. As shown in FIGS. 10-12, the micro-hook inverted J-shaped elements 82 and micro-hook T-shaped elements 84 extend radially outward from the tip section 22"", and thus point towards the pipe wall of the drain pipe when the device 10' is being used to unclog a drain. Advantageously, the radially disposed micro-hook elements 82, 84 do not get caught on the drain pipe when inserting and removing the device 10' from the drain. The radially disposed elements 82, 84 also do not get caught on the drain assembly when rotating the drain cleaning device 10' during the uncloging of the drain, thereby preventing the undesirable back-spinning of the device 10'. Also, advantageously, the radially disposed micro-hook elements 82, 84 engage accumulated hair in the drain pipe as the device 10' spins (i.e., the micro-hook elements 82, 84 lock onto the hair as the device 10' spins). That is, the fine micro-hook elements 82, 84 grab the fine hair that is disposed inside the drain pipe.

Yet another illustrative embodiment of the drain cleaning device is seen generally at 100 in FIGS. 19-30. Referring to these figures, it can be seen that, in some respects, the illustrative embodiment of FIGS. 19-30 is similar to that of the illustrative embodiments of FIGS. 1-2 and 13-18. Moreover, many elements are common to all of the embodiments. For the sake of brevity, the elements that the illustrative embodiment of FIGS. 19-30 has in common with the embodiments of FIGS. 1-2 and 13-18 will not be discussed in detail because these components have already been described above.

Like drain cleaning devices 10, 10' described above, the drain cleaning device 100 of the illustrative embodiment of FIGS. 19-30 generally comprises a handle section 102; an elongated rod section 120 connected to the handle section 102; and a tip section 122 connected to a second end portion 116 of the elongated rod section 120, the tip section 122 including a plurality of hook elements 124 disposed thereon, the plurality of hook elements 124 configured to grab and collect debris from a drain pipe. Similar to the drain cleaning devices 10, 10' described above, the drain cleaning device 100 is used for removing debris from a drain (e.g., from the drain pipe 48 of the drain 46 depicted in FIG. 8). Also, similar to the drain cleaning device 10 described above, the elongated rod section 120 comprises a plurality of longitudinally extending ribs 118 configured to add structural rigidity to the elongated rod section 120. In the illustrative embodiment of FIGS. 19-30, the plurality of longitudinally extending ribs 118 only extend along the upper portion of the length of elongated rod section 120.

Figure 19:
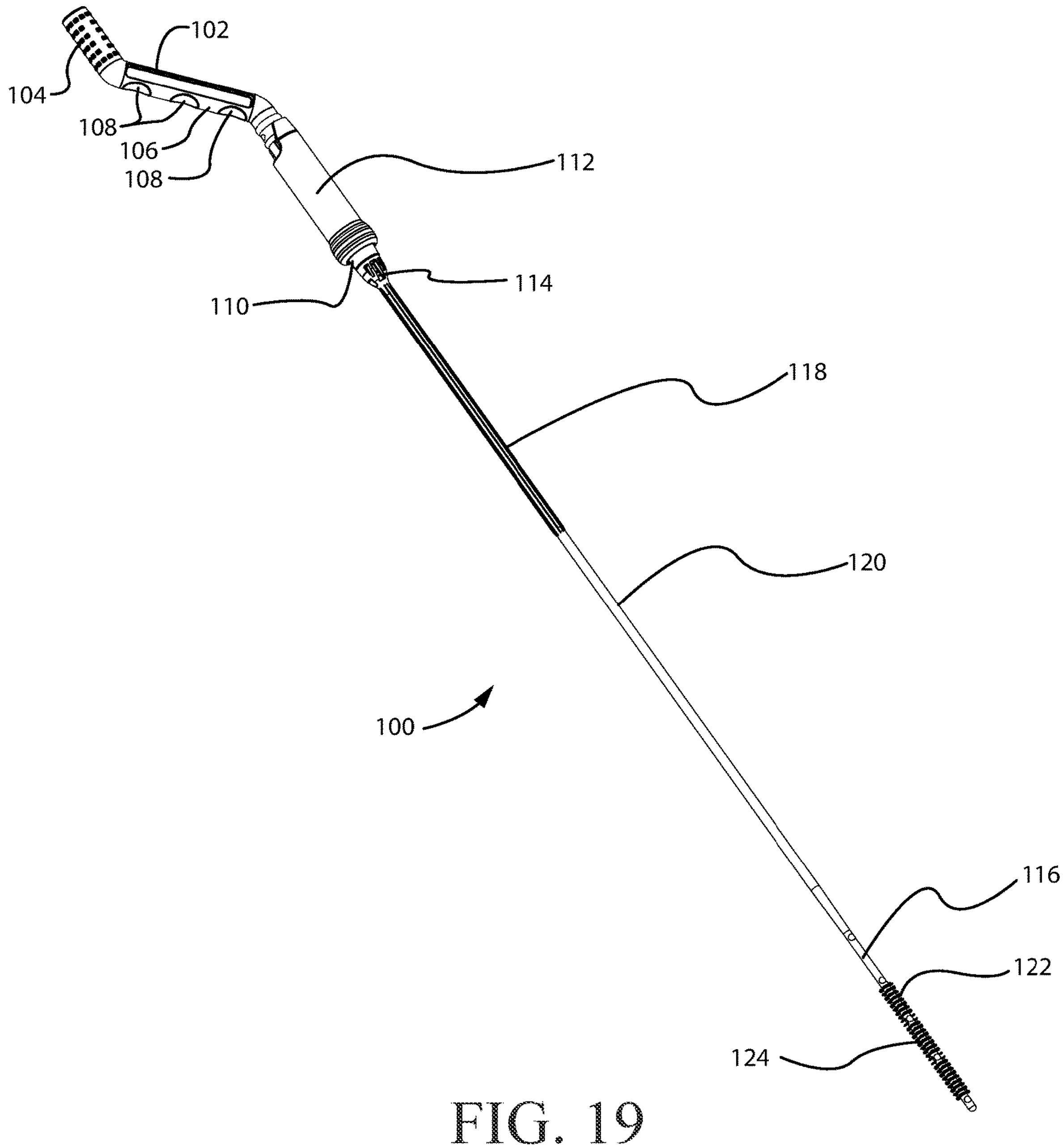
FIG. 19 is a perspective view of a drain cleaning device, according to a fourth embodiment of the invention.
Figure 20:
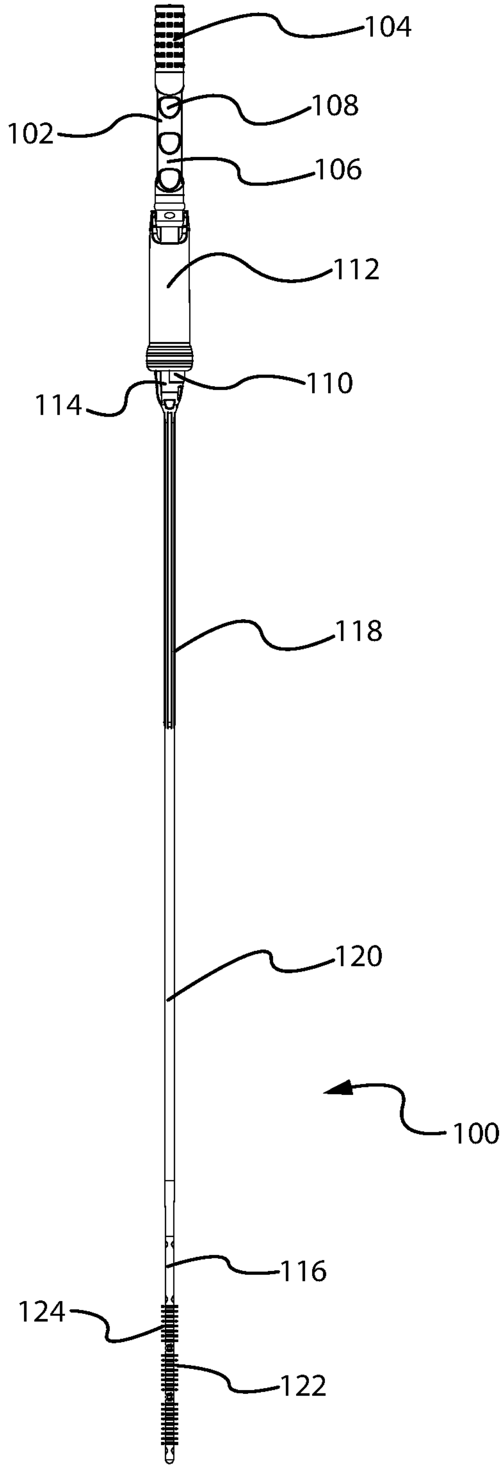
FIG. 20 is a rear elevational view of the drain cleaning device of FIG. 19.
Figure 21:
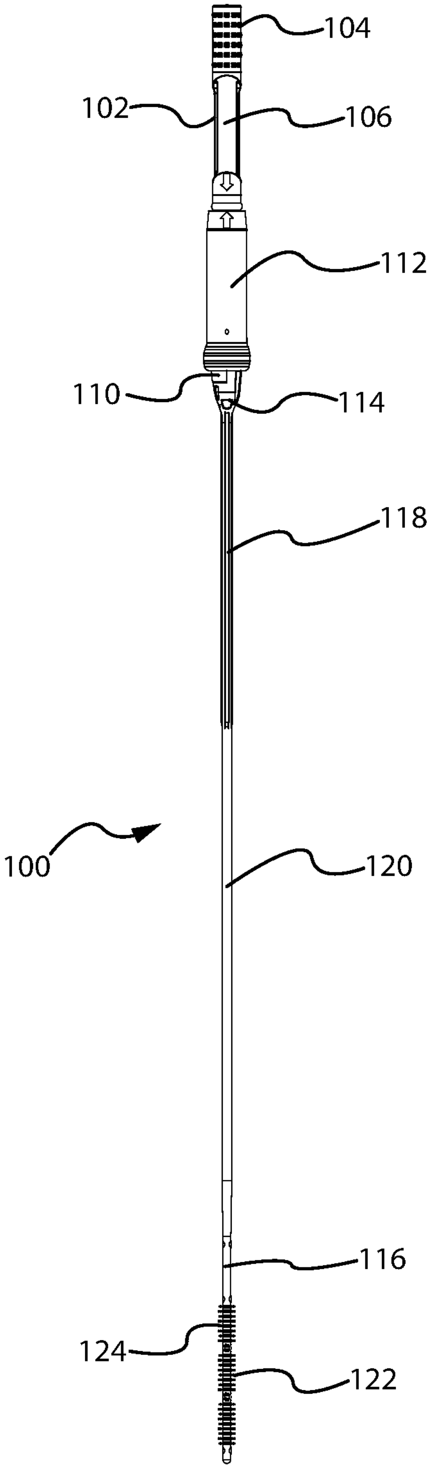
FIG. 21 is a front elevational view of the drain cleaning device of FIG. 19.
Figure 22:
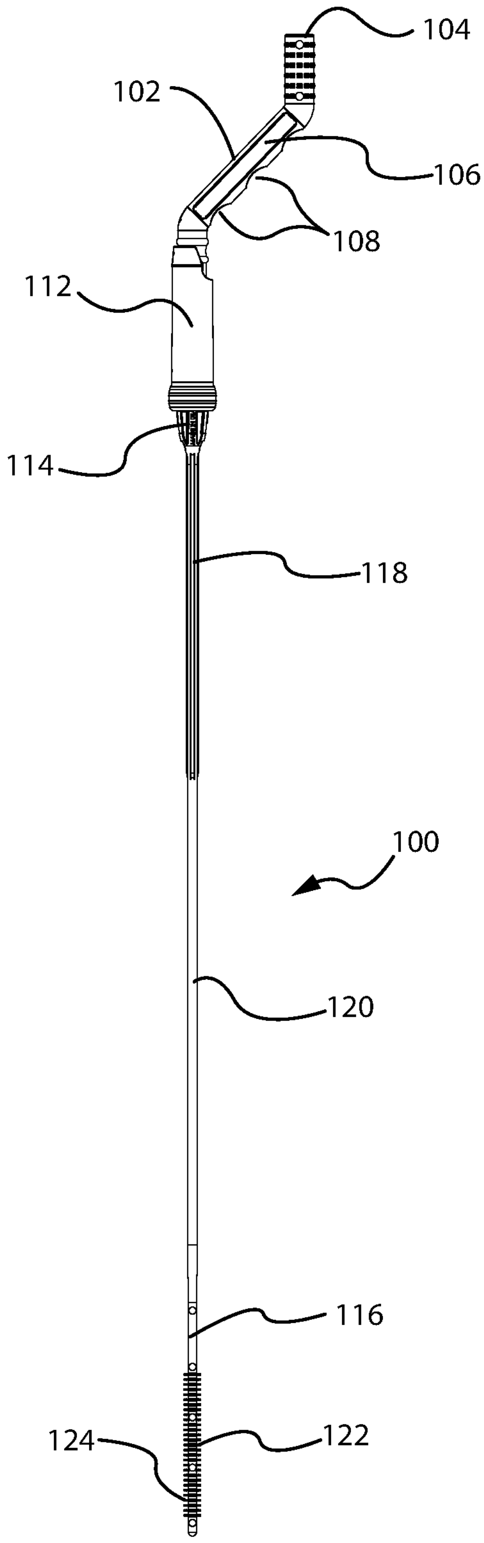
FIG. 22 is a first side elevational view of the drain cleaning device of FIG. 19.
Figure 23:
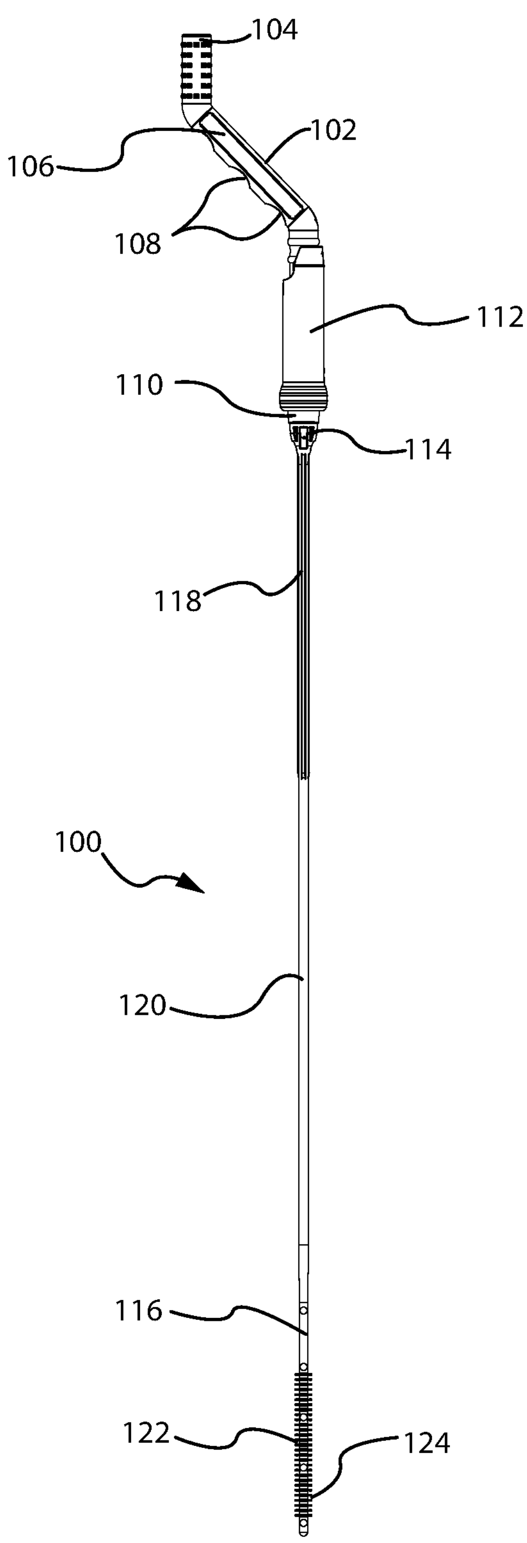
FIG. 23 is a second side elevational view of the drain cleaning device of FIG. 19.
Figure 24:
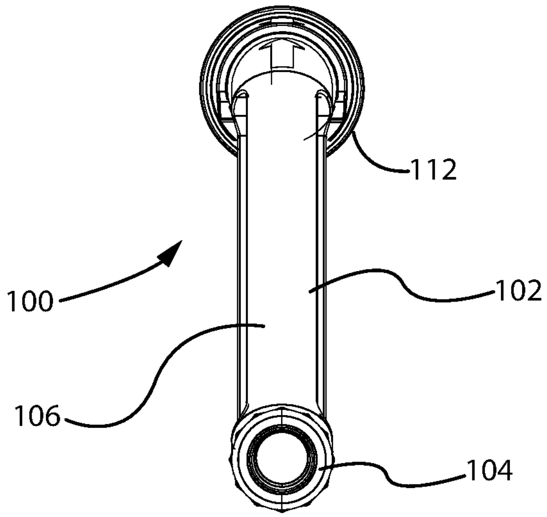
FIG. 24 is a first end view of the drain cleaning device of FIG. 19.
Figure 25:
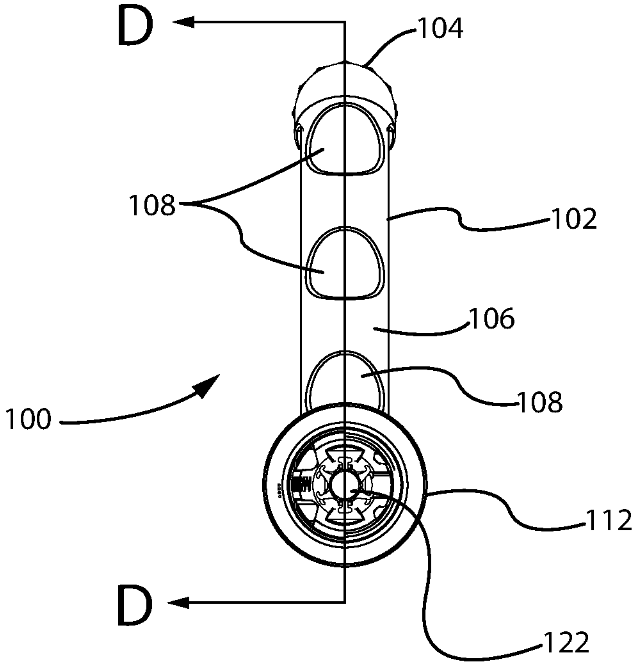
FIG. 25 is a second end view of the drain cleaning device of FIG. 19.
Figure 26:
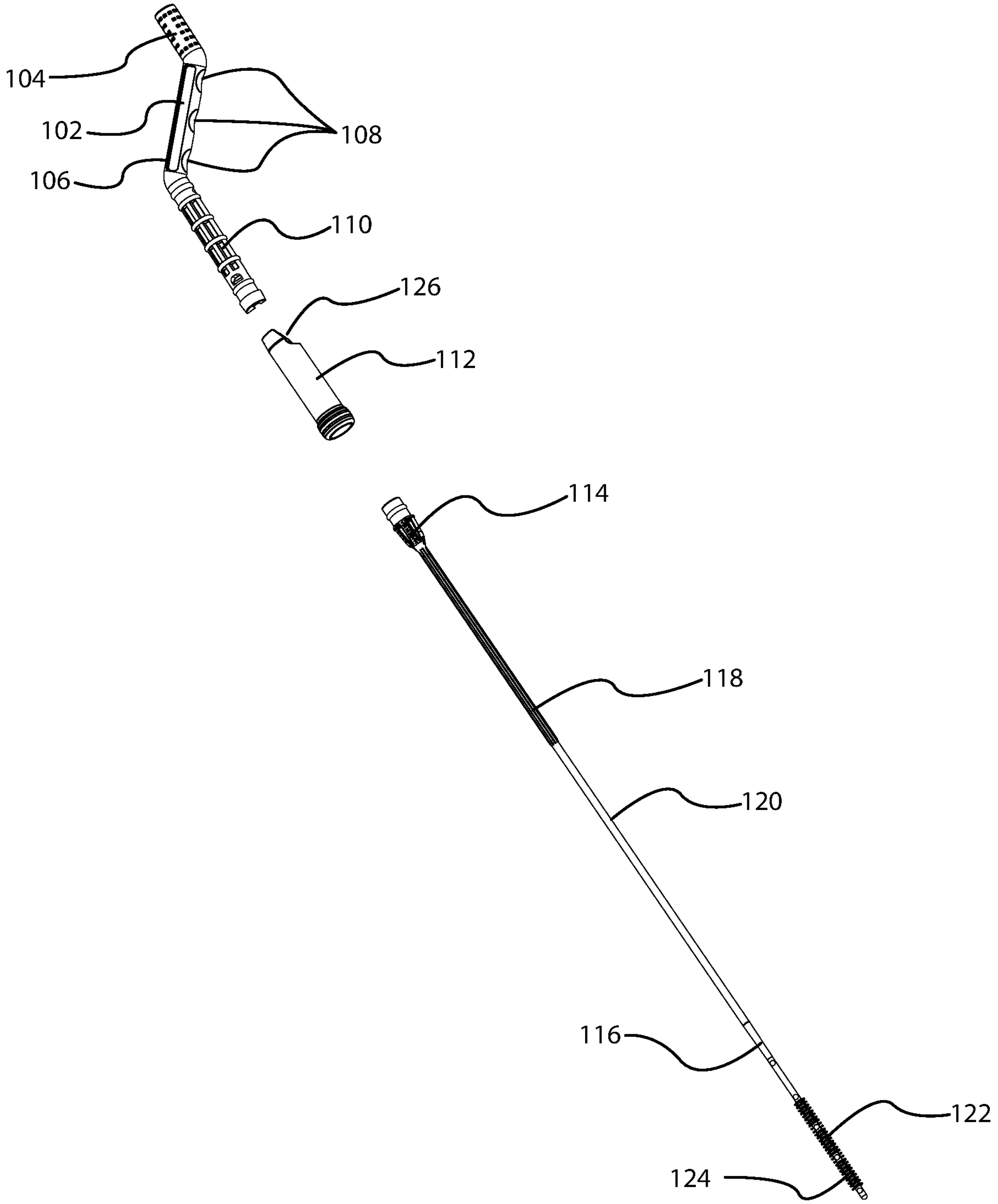
FIG. 26 is an exploded perspective view of the drain cleaning device of FIG. 19.

However, unlike drain cleaning devices 10, 10' described above, the handle section 102 of the drain cleaning device 100 of the illustrative embodiment of FIGS. 19-30 is detachable from the drain cleaning stick containing the elongated rod section 120 and the tip section 122. Referring initially to FIG. 19, it can be seen that the detachable handle section 102 generally comprises a top cylindrical portion 104, a lower connection portion 110, and a diagonal middle portion 106 that connects the top cylindrical portion 104 to the lower connection portion 110 of the detachable handle 102. Also, in this illustrative embodiment, a sleeve member 112 is rotatably disposed on the lower connection portion 110 (see FIG. 19). As shown in the illustrative embodiment of FIG. 19, the diagonal middle portion 106 of the detachable handle 102 comprises a plurality of finger concave recesses or indentations 108 for accommodating fingers of the user when the drain cleaning device 100 is being inserted into, and removed from the drain pipe. Further, in the illustrative embodiment, the top cylindrical portion 104 of the detachable handle 102 is configured to accommodate a first hand of a user during the spinning of the drain cleaning device 100 by the user. The sleeve member 112 on the lower connection portion 110 of the detachable handle 102 is configured to accommodate a second hand of the user during the spinning of the drain cleaning device 100 by the user.

In the illustrative embodiment, the sleeve member 112 of the detachable handle section 102 can be moved back and forth between two possible positions along the lower connection portion 110 of the detachable handle 102: (i) a disengaged position where the drain cleaning stick is able to be released from the detachable handle section 102, and (ii) an engaged position where the distal end portion of the lower handle connection portion 110 is locked into engagement with the proximal end portion 114 of the drain cleaning stick.

After use, the drain cleaning stick containing the elongated rod section 120 and the tip section 122 may be disengaged from the handle section 102 (as described below) and can be discarded in an appropriate disposal receptacle, or in an appropriate recycling collection container.

Figure 27A:
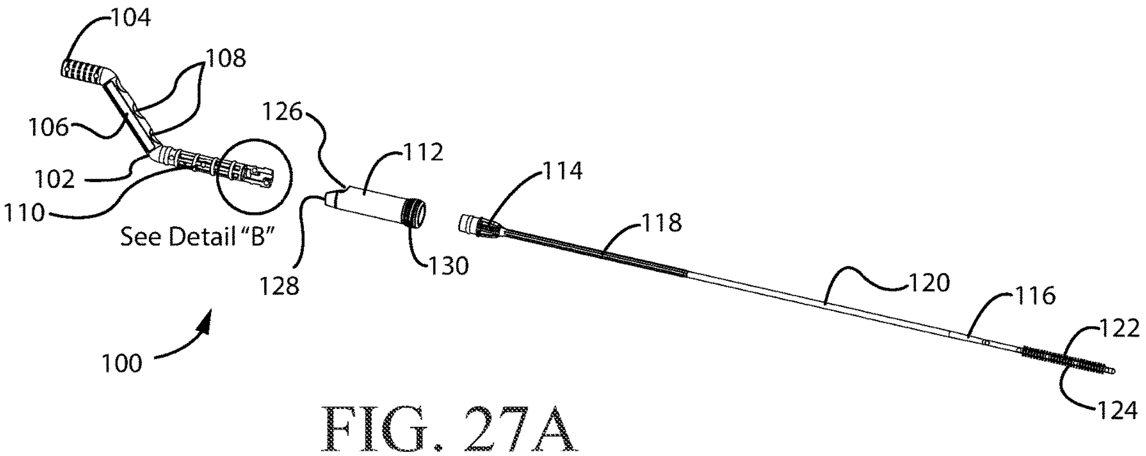
FIG. 27A is another exploded perspective view of the drain cleaning device of FIG. 19.
Figure 28A:
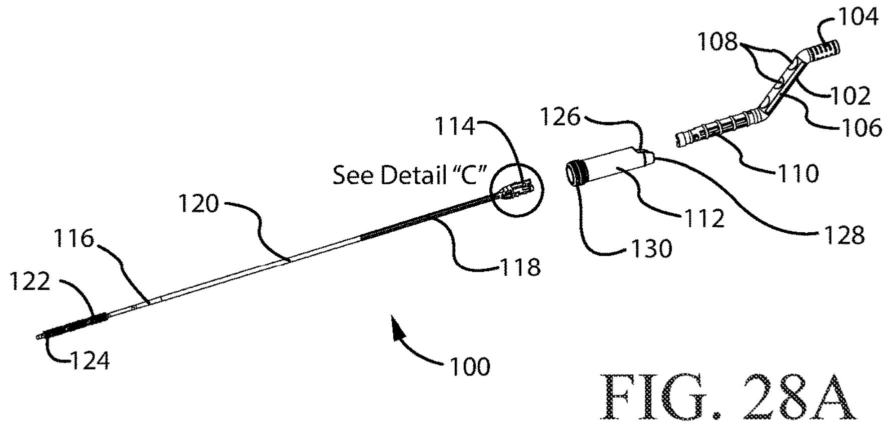
FIG. 28A is yet another exploded perspective view of the drain cleaning device of FIG. 19.
Figure 29A:
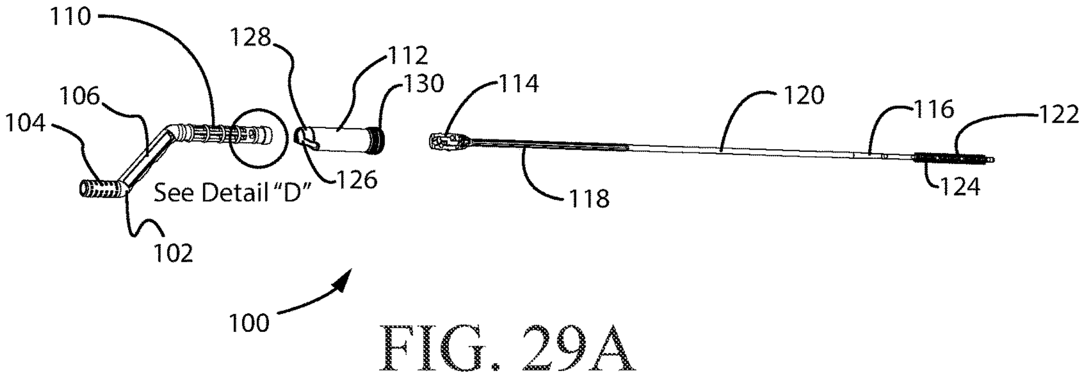
FIG. 29A is still another exploded perspective view of the drain cleaning device of FIG. 19.

In the illustrative embodiment, the sleeve member 112 of the detachable handle section 102 has a generally cylindrical shape, but may include a notch 126 at its proximal end 128 (see FIGS. 27A, 28A, and 29A). When the sleeve member 112 is moved backward to its disengaged position, the interlocking ends of the drain cleaning stick and detachable handle section 102 are exposed and can be detached.

In the illustrative embodiment, the interlocking region at the proximal end 114 of the drain cleaning stick includes a partial annular shoulder stop 146 and a partial cylindrical end section 144 that match a respective partial annular shoulder stop 138 and partial cylindrical end section 132 at the distal end of the lower connection portion 110 of the detachable handle section 102 (see FIGS. 27A-29B). When the sleeve member 112 is moved to the disengaged position, the two corresponding partial cylindrical portions 132 and 144, are exposed and can be decoupled or detached. Alternatively, when the sleeve member 112 is moved to the engaged position, the distal end 130 of the sleeve member 112 is moved axially forward until it rests against the two partial annular shoulder stops, 138 and 146. When a drain cleaning stick is engaged, i.e., its proximal end portion 114 is interlocked with the distal end portion of the lower connection portion 110 of the detachable handle section 102, the sleeve member 112 can be moved to its engaged position and the drain cleaning stick is ready for use and can be properly operated.

Figure 27B:
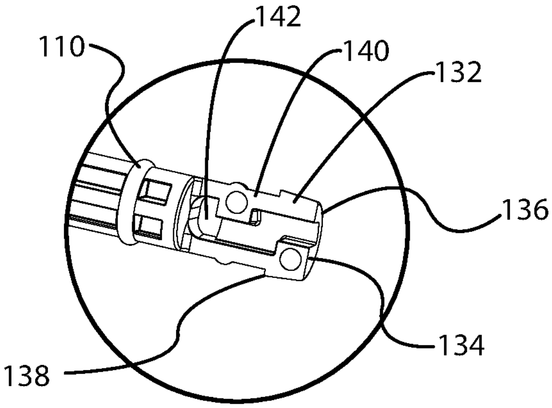
FIG. 27B is an enlarged perspective view of the distal end portion of the detachable handle section of the drain cleaning device of FIG. 19, which depicts a first side of the distal end portion of the detachable handle section (Detail "B")
Figure 28B:
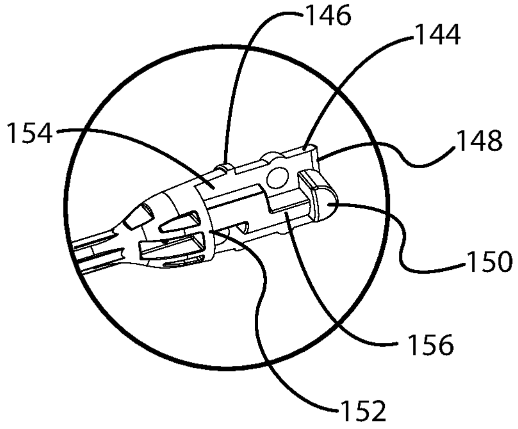
FIG. 28B is an enlarged perspective view of the proximal end portion of the drain cleaning stick of the drain cleaning device of FIG. 19 (Detail "C")
Figure 29B:
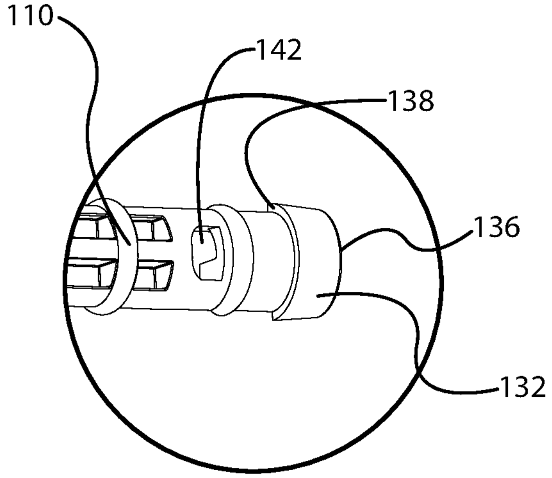
FIG. 29B is an enlarged perspective view of the distal end portion of the detachable handle section of the drain cleaning device of FIG. 19, which depicts a second side of the distal end portion of the detachable handle section (Detail "D")
Figure 30:
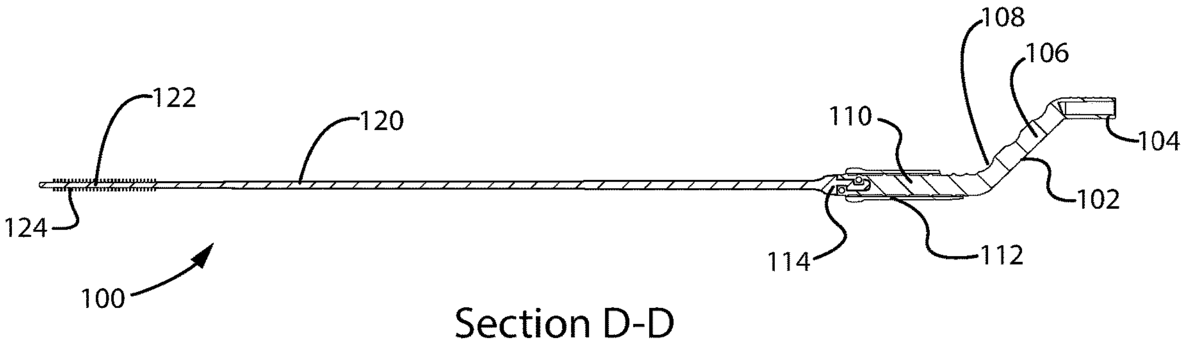
FIG. 30 is a longitudinal sectional view cut through the drain cleaning device of FIG. 19, wherein the section is generally cut along the cutting-plane line D-D in FIG. 25.

The interlocking region of the drain cleaning stick and the lower connection portion 110 of the detachable handle section 102 is shown in more detail in the illustrative embodiment of FIGS. 27B, 28B, and 29B.

When sleeve member 112 is moved to its disengaged position, the drain cleaning stick can be disengaged from the distal end portion of the detachable handle section 102. In this position, the partial cylindrical end section 132 at the distal end of the lower connection portion 110 of the detachable handle section 102 is clearly exposed (see FIGS. 27B and 29B).

When interlocked with the corresponding end of the handle section 102, the partial cylindrical end section 144 of the drain cleaning stick combines with the partial cylindrical end section 132 at the distal end of the lower connection portion 110 of the detachable handle section 102 to form a generally cylindrical interlocked structure that fits inside the bore of the sleeve member 112; and this interlocked structure can rotate inside the sleeve member 112 (e.g., during routine operation) when the sleeve is moved to the engaged position.

In addition, in the illustrative embodiment shown in FIGS. 19-30, when the drain cleaning stick is interlocked with the lower connection portion 110 of the detachable handle section 102, protrusion 150 (see FIG. 28B) of the drain cleaning stick fits in the corresponding opening 142 (see FIGS. 27B and 29B), and axial stop 152 and surfaces 154 and 156 of the proximal end 114 of the drain cleaning stick fit in the corresponding stop 136 and surfaces 134 and 140 at the distal end of lower connection portion 110 of the detachable handle section 102 (refer to FIGS. 27B and 28B).

In the illustrative embodiment, a further shaped axial stop surface 148 is provided at the proximal end 114 of the drain cleaning stick (see FIG. 28B), which matches a correspondingly shaped cavity or opening (in axially proximal surface of opening 142) in the distal end of the lower connection portion 110 of the detachable handle section 102 to ensure a uniquely matched interlock between the drain cleaning stick and the detachable handle section 102. That is, as best shown in FIG. 28B, the partial cylindrical end section 144 of the drain cleaning stick is provided with an internal zigzag protruding surface 156 that interlocks with an internal zigzag recess in the partial cylindrical end section 132 of the detachable handle section 102 connected to opening 142.

In the illustrative embodiment, a further detent can be provided at the distally lower surface of protrusion 150 to engage with a corresponding receiving indentation in the radially outer portion of opening 142 in the detachable handle section 102, in order to ensure a snap fit or other secure attachment.

In the illustrative embodiment, contact surface 154 at the distal end 114 of the drain cleaning stick mates with corresponding contact surface 140 at the distal end of detachable handle section 102, when the drain cleaning stick and detachable handle section 102 are fully engaged. Similarly, when engaged, axial stop surface 152 at the end of the drain cleaning stick mates with the corresponding handle stop surface 136. Furthermore, any tab feature, as shown projecting from surface 140 of the distal end of the detachable handle section 102, can be provided to mate with a corresponding opening in the proximal end of the drain cleaning stick.

However, it is noted that the combination of the protrusion 150 and corresponding opening 142, as well as other notch-opening relationships between the proximal end of the drain cleaning stick and the distal end of the detachable handle section 102 are exemplary of mating relationships that can vary in size and shape. It is most important that the mating contours of the proximal end of the drain cleaning stick and the corresponding distal end of the detachable handle section 102 match in a manner that ensures the adequate transmission of the torque provided by the user to the distal tip section 122 of the drain cleaning device 100 without loosening or disengaging the two interlocked ends during use. It is also important that different reusable handle sections 102 be provided with unique mating contours at the interlocking end section to match drain cleaning sticks that are uniquely matched to mate and interlock with the reusable handle section 102.

The particular contour of the matching shaped protrusion of the drain cleaning stick and shaped opening of the detachable handle section 102, ensure that a unique drain cleaning stick can be uniquely engaged with a correspondingly unique detachable handle section 102.

A kit containing a set of differently shaped drain cleaning sticks, each with a correspondingly matched detachable handle section 102, can be used, so long as the interlocking ends are suitably matched and the rotation of the detachable handle section 102 can cause the rotation of the drain cleaning device 100 to remove debris from piping structures. Different kits can contain drain cleaning devices that are matched to one unique detachable handle 102, or to more than one detachable handle in different kits. The drain cleaning devices in any individual kit have interlocking portions with proximal contours that match the corresponding contours of the interlocking portions of the detachable handles in the individual kits.

In the illustrative embodiment of FIGS. 19-30, with particular reference to FIGS. 19-23, the tip section 122 of the drain cleaning device 100 comprises the combination of injection-molded micro-hook inverted J-shaped elements and injection-molded micro-hook T-shaped elements that were described above in detail with reference to the device 80 of FIGS. 10-12. As shown in FIGS. 10-12, the micro-hook inverted J-shaped elements 82 and micro-hook T-shaped elements 84 extend radially outward from the tip section 22'''', and thus point towards the pipe wall of the drain pipe when the device 100 is being used to unclog a drain. Advantageously, the radially disposed micro-hook elements 82, 84 do not get caught on the drain pipe when inserting and removing the device 100 from the drain. The radially disposed elements 82, 84 also do not get caught on the drain assembly when rotating the drain cleaning device 100 during the unclogging of the drain, thereby preventing the undesirable back-spinning of the device 100. Also, advantageously, the radially disposed micro-hook elements 82, 84 engage accumulated hair in the drain pipe as the device 100 spins (i.e., the micro-hook elements 82, 84 lock onto the hair as the device 100 spins). That is, the fine micro-hook elements 82, 84 grab the fine hair that is disposed inside the drain pipe.

Still another illustrative embodiment of the drain cleaning device is seen generally at 200 in FIGS. 31-37. Referring to these figures, it can be seen that, in some respects, the illustrative embodiment of FIGS. 31-37 is similar to that of the illustrative embodiments of FIGS. 1-2, 13-18, and 19-30. Moreover, many elements are common to all of the embodiments. For the sake of brevity, the elements that the illustrative embodiment of FIGS. 31-37 has in common with the embodiments of FIGS. 1-2, 13-18, and 19-30 will not be discussed in detail because these components have already been described above.

Like drain cleaning devices 10, 10', 100 described above, the drain cleaning device 200 of the illustrative embodiment of FIGS. 31-37 generally comprises a handle section 202; an elongated rod section 210 with a first end portion 208 connected to the handle section 202; and a tip section 214 connected to a second end portion 212 of the elongated rod section 210, the tip section 214 including a plurality of hook elements 216 disposed thereon, the plurality of hook elements 216 configured to grab and collect debris from a drain pipe. Similar to the drain cleaning devices 10, 10', 100 described above, the drain cleaning device 200 is used for removing debris from a drain (e.g., from the drain pipe 48 of the drain 46 depicted in FIG. 8).

Figure 31:
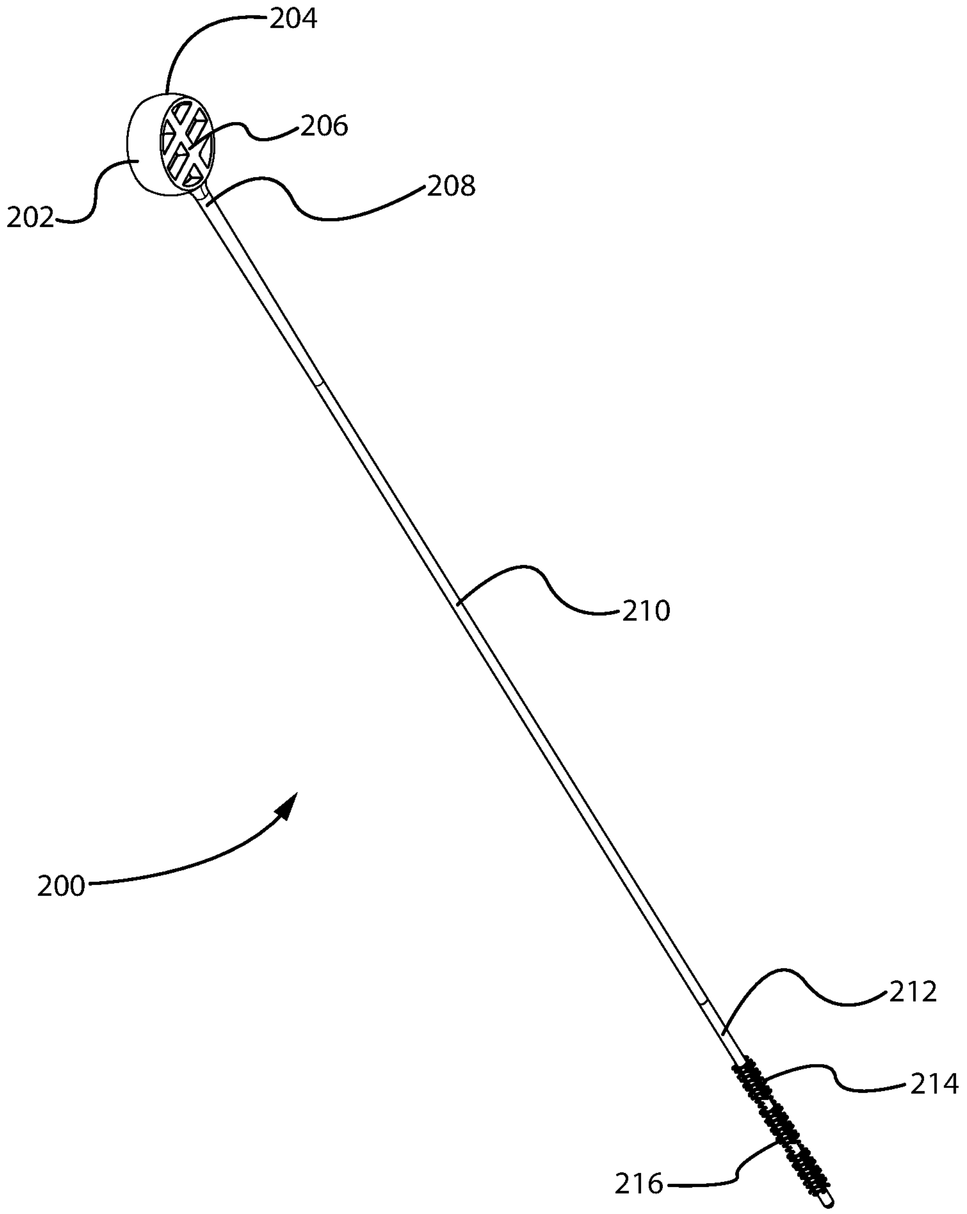
FIG. 31 is a perspective view of a drain cleaning device, according to a fifth embodiment of the invention.
Figure 32:
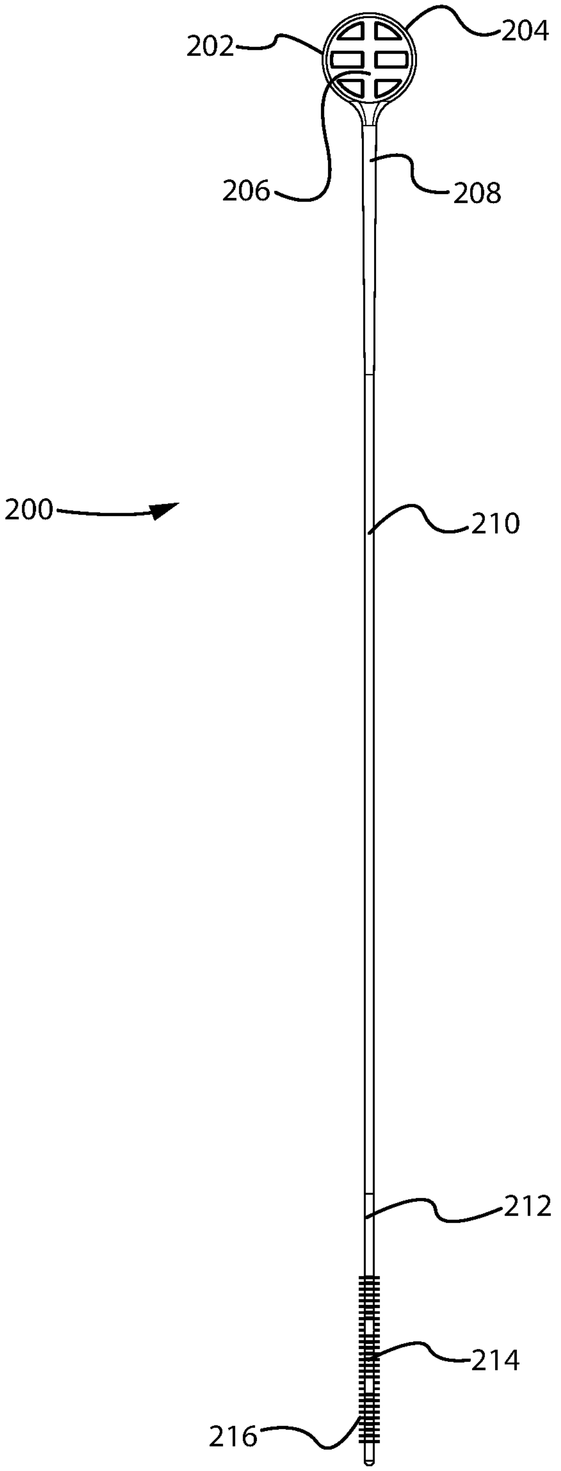
FIG. 32 is a front elevational view of the drain cleaning device of FIG. 31.
Figure 33:
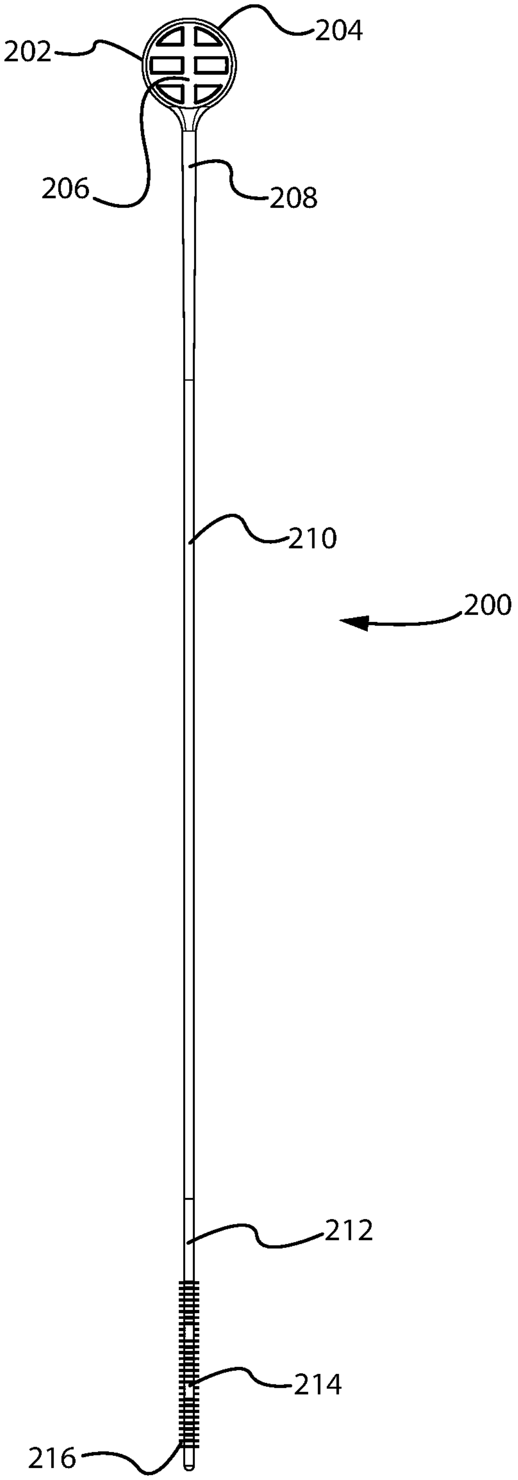
FIG. 33 is a rear elevational view of the drain cleaning device of FIG. 31.
Figure 34:
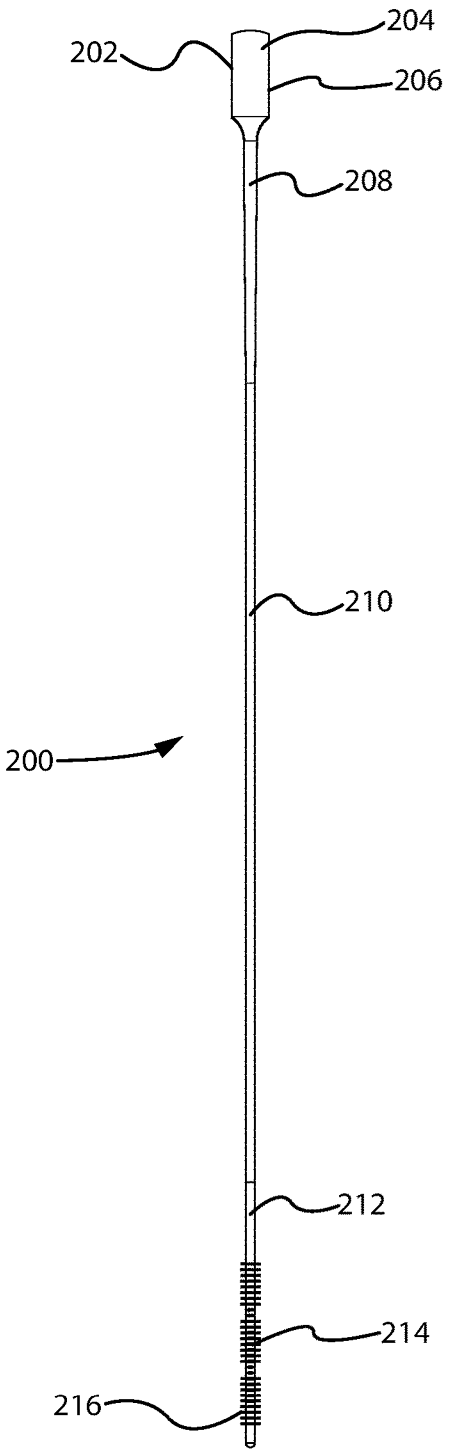
FIG. 34 is a first side elevational view of the drain cleaning device of FIG. 31.
Figure 35:
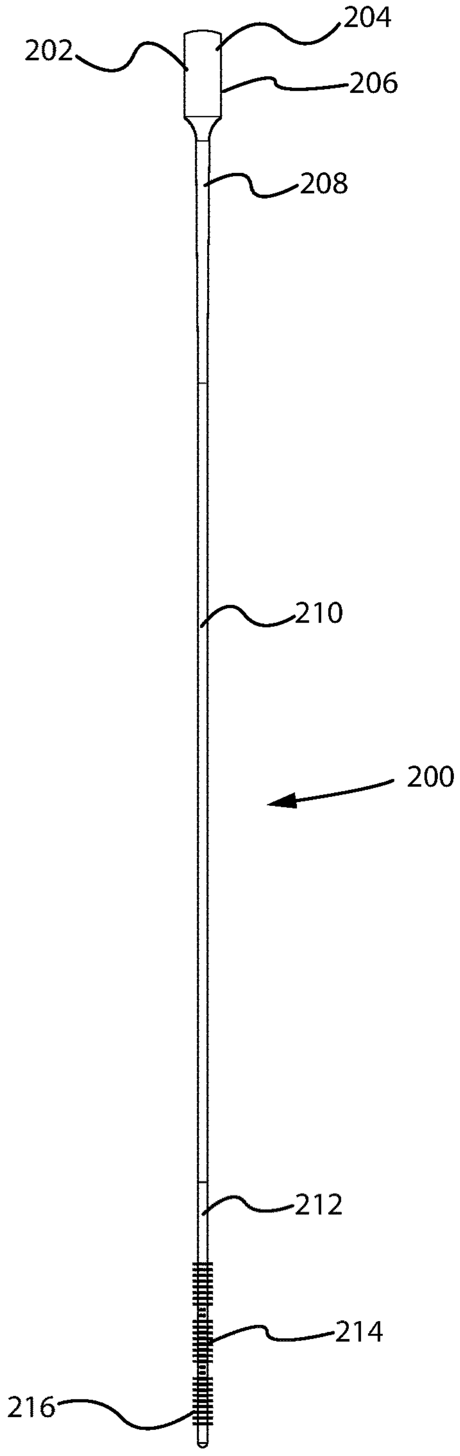
FIG. 35 is a second side elevational view of the drain cleaning device of FIG. 31.

However, unlike drain cleaning devices 10, 10', 100 described above, the handle section 202 of the drain cleaning device 200 of the illustrative embodiment of FIGS. 31-37 has an ergonomic handle body portion (see e.g., FIG. 31) configured to fit comfortably into the hand of a user. More specifically, as shown in FIG. 31, the ergonomic handle body portion of the handle 202 has a partially spherical shape with a curved peripheral surface 204 and oppositely disposed flat sides 206 with a grid-like pattern (e.g., the ergonomic handle body portion may be molded from plastic with rectangular recesses arranged in grid-like or waffle-like pattern so as to reduce the amount of plastic material required to form the handle 202).

In the illustrative embodiment of FIGS. 31-37, with particular reference to FIG. 31, the tip section 214 of the drain cleaning device 200 comprises the combination of injection-molded micro-hook inverted J-shaped elements and injection-molded micro-hook T-shaped elements that were described above in detail with reference to the device 80 of FIGS. 10-12. As shown in FIGS. 10-12, the micro-hook inverted J-shaped elements 82 and micro-hook T-shaped elements 84 extend radially outward from the tip section 22'''', and thus point towards the pipe wall of the drain pipe when the device 200 is being used to unclog a drain. Advantageously, the radially disposed micro-hook elements 82, 84 do not get caught on the drain pipe when inserting and removing the device 200 from the drain. The radially disposed elements 82, 84 also do not get caught on the drain assembly when rotating the drain cleaning device 200 during the uncloging of the drain, thereby preventing the undesirable back-spinning of the device 200. Also, advantageously, the radially disposed micro-hook elements 82, 84 engage accumulated hair in the drain pipe as the device 200 spins (i.e., the micro-hook elements 82, 84 lock onto the hair as the device 200 spins). That is, the fine micro-hook elements 82, 84 grab the fine hair that is disposed inside the drain pipe.

In other embodiments, the plurality of hook elements of the drain cleaning device 200 may comprise a hook material strip 30 (e.g., made from the hook portion of Velcro®—see e.g., FIGS. 5 and 9), rather than being injection-molded micro-hook elements.

Figure 38:
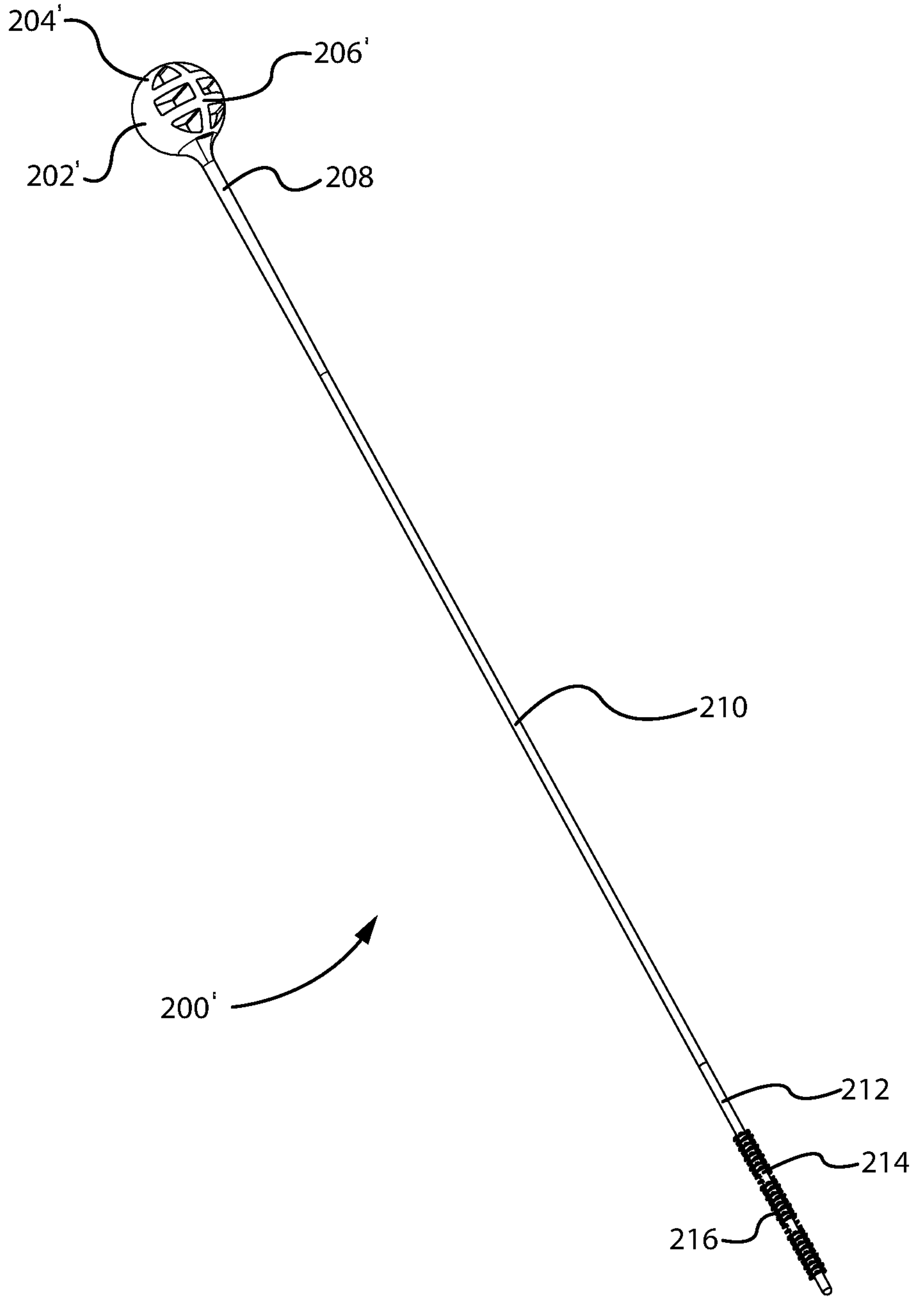
FIG. 38 is a perspective view of a drain cleaning device, according to a sixth embodiment of the invention.
Figure 39:
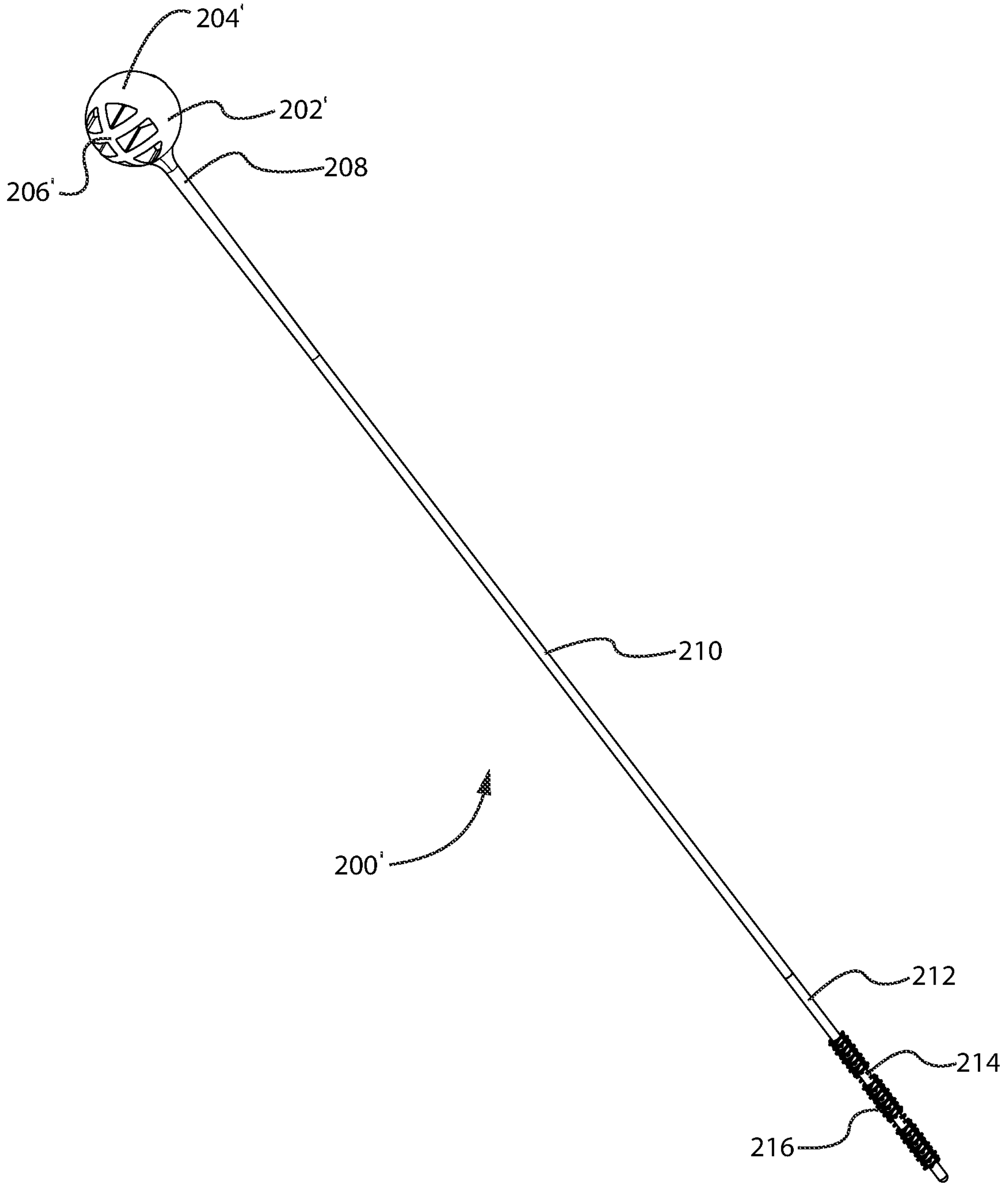
FIG. 39 is another perspective view of the drain cleaning device of FIG. 38.

Yet another illustrative embodiment of the drain cleaning device is seen generally at 200' in FIGS. 38 and 39. Referring to these figures, it can be seen that, in most respects, the illustrative embodiment of FIGS. 38 and 39 is similar to that of the illustrative embodiment of FIGS. 31-37. Moreover, many elements are common to all of the embodiments. For the sake of brevity, the elements that the illustrative embodiment of FIGS. 38 and 39 has in common with the embodiments of FIGS. 31-37 will not be discussed because these components have already been described above.

Like the drain cleaning device 200 described above, the handle section 202' of the drain cleaning device 200' of the illustrative embodiment of FIGS. 38 and 39 has an ergonomic handle body portion configured to fit comfortably into the hand of a user. However, the ergonomic handle body portion of the handle section 202' of the drain cleaning device 200' has a different shape than the handle section 202 of the drain cleaning device 200 in FIGS. 31-37. As shown in FIGS. 38 and 39, the ergonomic handle body portion of the handle 202' has a substantially spherical shape or ball shape with a curved peripheral surface 204' and oppositely disposed curved sides 206'. In the illustrative embodiment of FIGS. 38 and 39, it can be seen that the oppositely disposed curved sides 206' of the spherically-shaped ergonomic handle body portion may have a grid-like pattern formed therein (e.g., the spherically-shaped ergonomic handle body portion may be molded from plastic with rectangular recesses arranged in a grid-like or waffle-like pattern so as to reduce the amount of plastic material required to form the handle 202').

Figure 36:
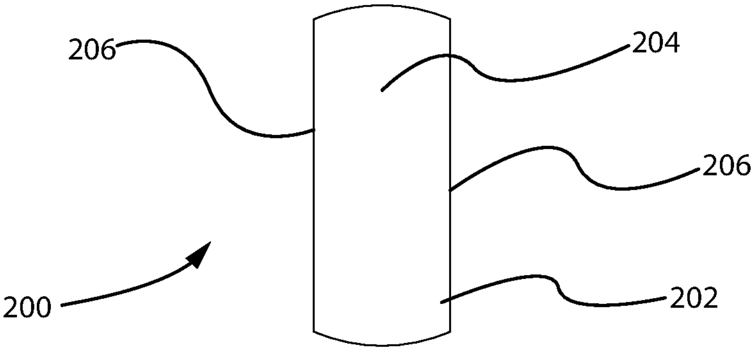
FIG. 36 is a first end view of the drain cleaning device of FIG. 31.
Figure 37:
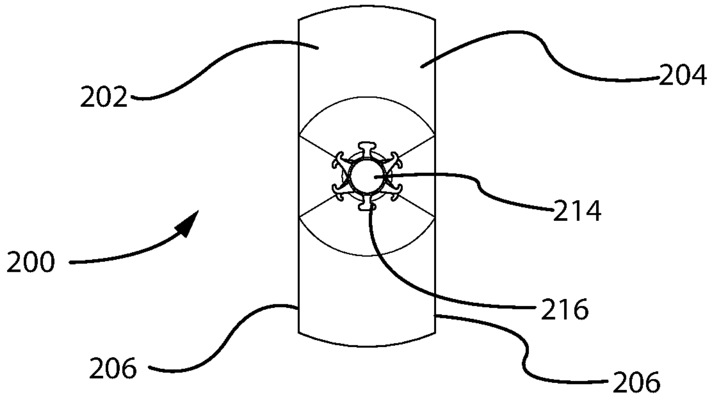
FIG. 37 is a second end view of the drain cleaning device of FIG. 31.
Figure 40:
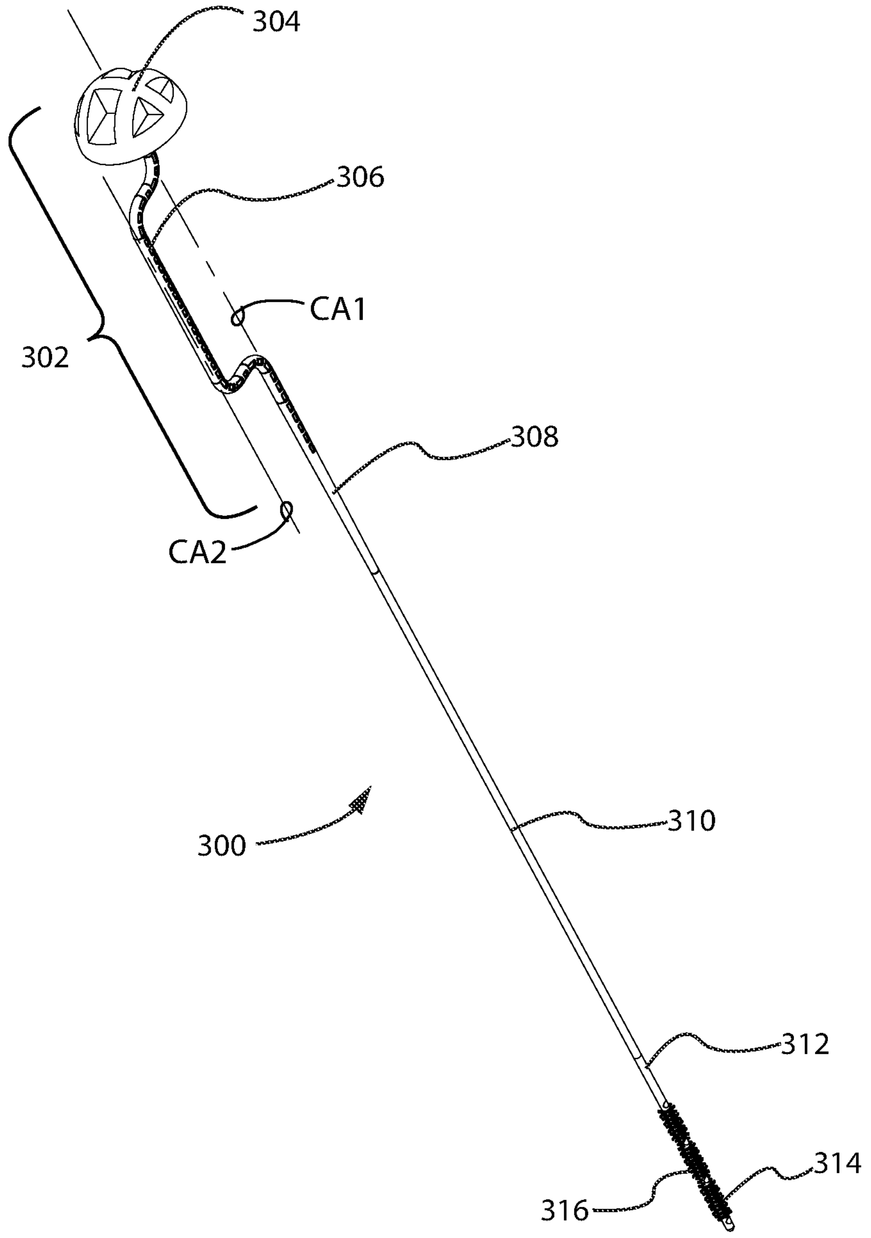
FIG. 40 is a perspective view of a drain cleaning device, according to a seventh embodiment of the invention.
Figure 41:
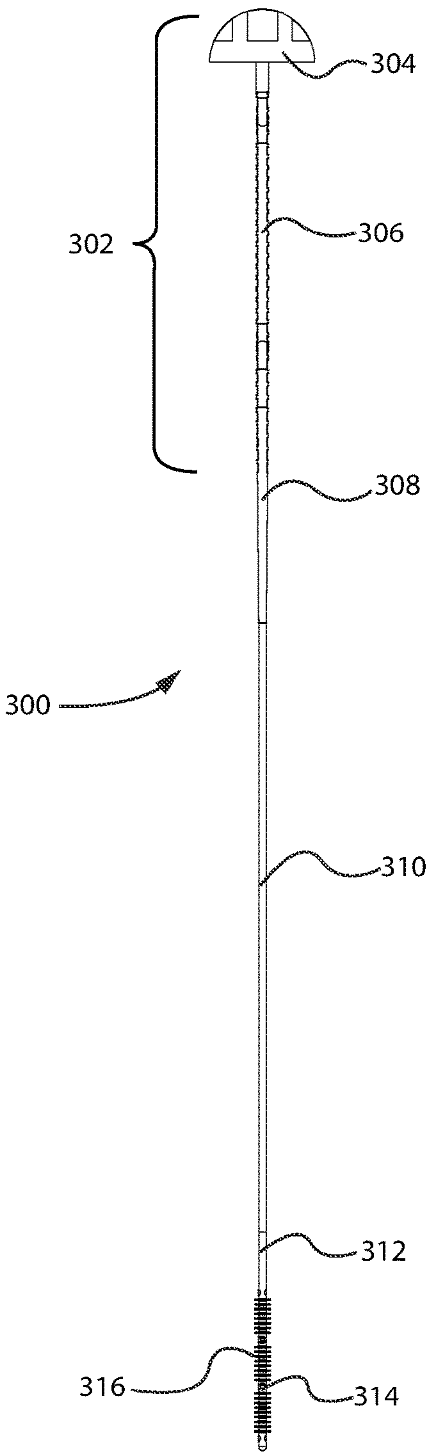
FIG. 41 is a front elevational view of the drain cleaning device of FIG. 40.
Figure 42:
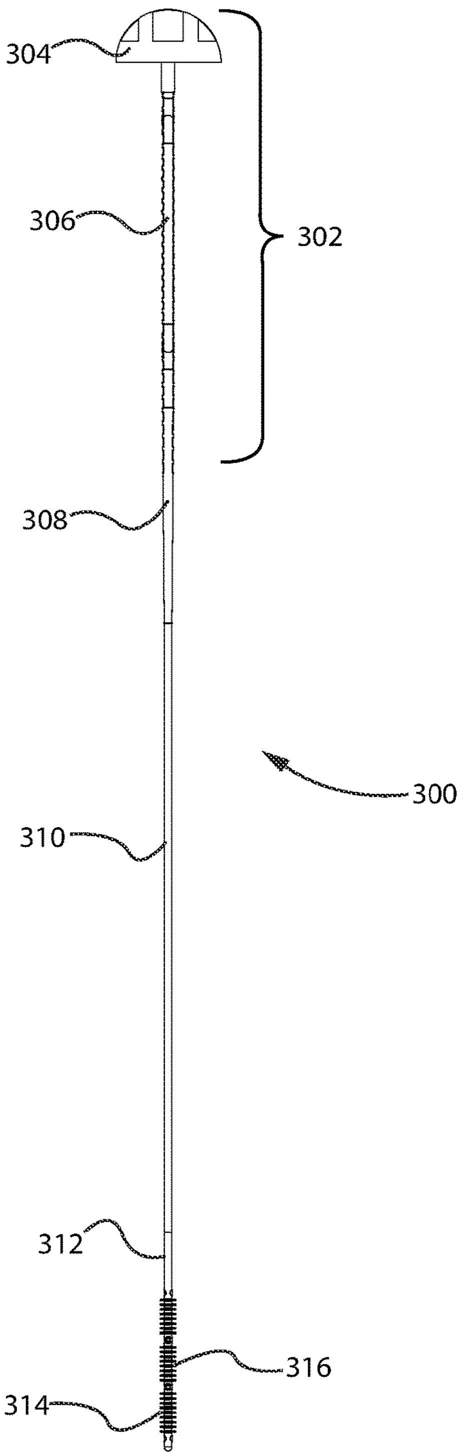
FIG. 42 is a rear elevational view of the drain cleaning device of FIG. 40.

Still another illustrative embodiment of the drain cleaning device is seen generally at 300 in FIGS. 40-46. Referring to these figures, it can be seen that, in some respects, the illustrative embodiment of FIGS. 40-36 is similar to that of the illustrative embodiments of FIGS. 1-2, 13-18, 19-30, and 31-37. Moreover, many elements are common to all of the embodiments. For the sake of brevity, the elements that the illustrative embodiment of FIGS. 40-46 has in common with the embodiments of FIGS. 1-2, 13-18, 19-30, and 31-37 will not be discussed in detail because these components have already been described above.

Like drain cleaning devices 10, 10', 100, 200, 200' described above, the drain cleaning device 300 of the illustrative embodiment of FIGS. 40-46 generally comprises a handle section 302; an elongated rod section 310 with a first end portion 308 connected to the handle section 302; and a tip section 314 connected to a second end portion 312 of the elongated rod section 310, the tip section 314 including a plurality of hook elements 316 disposed thereon, the plurality of hook elements 316 configured to grab and collect debris from a drain pipe. Similar to the drain cleaning devices 10, 10', 100, 200, 200' described above, the drain cleaning device 300 is used for removing debris from a drain (e.g., from the drain pipe 48 of the drain 46 depicted in FIG. 8).

Figure 43:
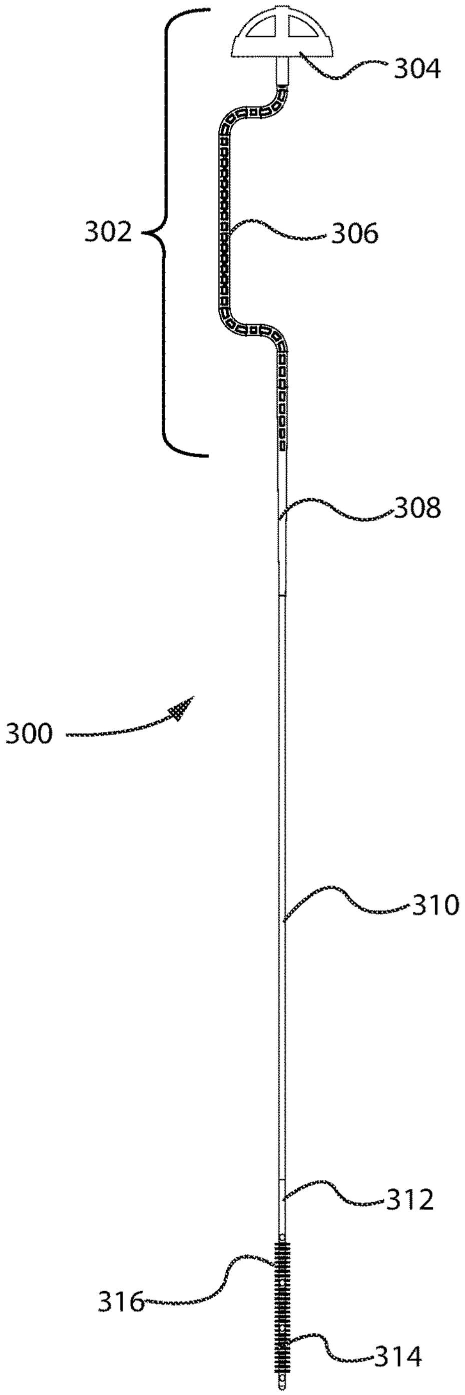
FIG. 43 is a first side elevational view of the drain cleaning device of FIG. 40.
Figure 44:
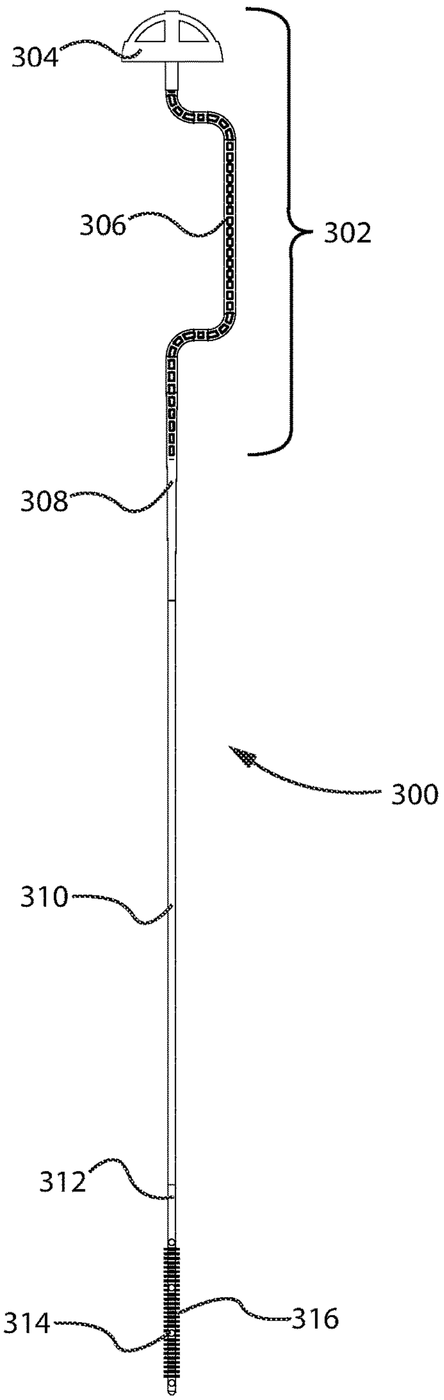
FIG. 44 is a second side elevational view of the drain cleaning device of FIG. 40.
Figure 45:
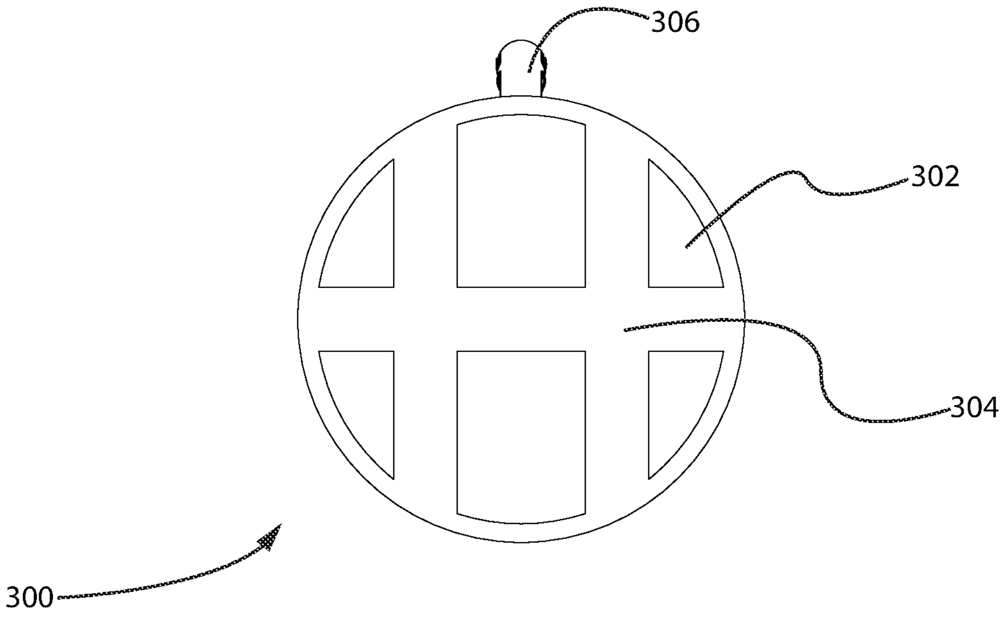
FIG. 45 is a first end view of the drain cleaning device of FIG. 40.
Figure 46:
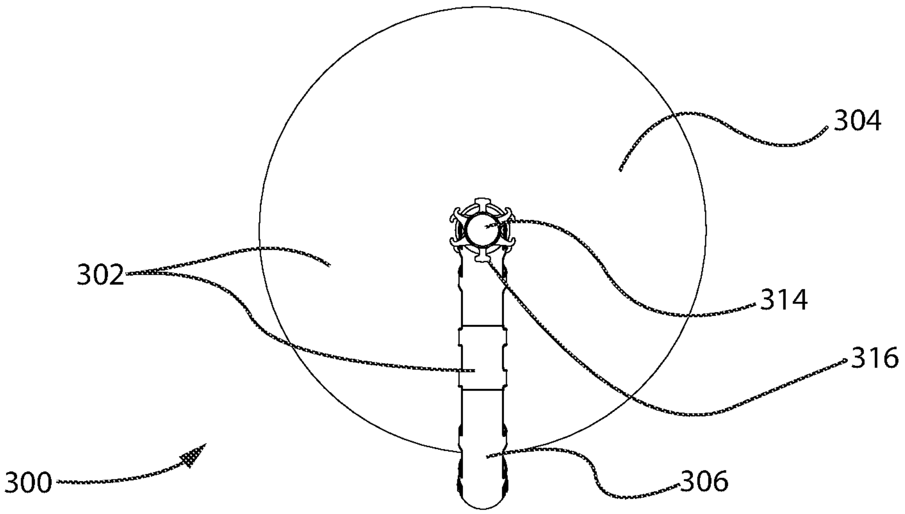
FIG. 46 is a second end view of the drain cleaning device of FIG. 40.

However, unlike drain cleaning devices 10, 10', 100, 200, 200' described above, the handle section 302 of the drain cleaning device 300 of the illustrative embodiment of FIGS. 40-46 has an offset handle portion with a handle segment 306 that is offset relative to the central longitudinal axis CA1 of the drain cleaning device 300, and the handle segment 306 has a segment longitudinal axis CA2 that is disposed generally parallel to, and radially offset from the central longitudinal axis CA1 of the drain cleaning device 300. As shown in FIGS. 40, 43, and 44, in the illustrative embodiment, the offset handle portion of the handle section 302 is generally U-shaped. Also, in the illustrative embodiment, the handle section 302 further comprises a top handle body portion 304 disposed above the offset handle portion, the top handle body portion 304 being substantially wider than a remainder of the handle section so as to fit comfortably into the hand of the user. For example, as shown in FIGS. 40, 43, and 44, the top handle body portion 304 of the handle section 302 may have a generally hemispherical shape or hemispherical shape with a grid-like pattern formed therein (e.g., the hemispherically-shaped top handle body portion 304 may be molded from plastic with rectangular recesses arranged in a grid-like or waffle-like pattern so as to reduce the amount of plastic material required to form the top handle body portion 304).

In the illustrative embodiment of FIGS. 40-46, with particular reference to FIG. 40, the tip section 314 of the drain cleaning device 300 comprises the combination of injection-molded micro-hook inverted J-shaped elements and injection-molded micro-hook T-shaped elements that were described above in detail with reference to the device 80 of FIGS. 10-12. As shown in FIGS. 10-12, the micro-hook inverted J-shaped elements 82 and micro-hook T-shaped elements 84 extend radially outward from the tip section 22"", and thus point towards the pipe wall of the drain pipe when the device 300 is being used to unclog a drain. Advantageously, the radially disposed micro-hook elements 82, 84 do not get caught on the drain pipe when inserting and removing the device 300 from the drain. The radially disposed elements 82, 84 also do not get caught on the drain assembly when rotating the drain cleaning device 300 during the unclogging of the drain, thereby preventing the undesirable back-spinning of the device 300. Also, advantageously, the radially disposed micro-hook elements 82, 84 engage accumulated hair in the drain pipe as the device 300 spins (i.e., the micro-hook elements 82, 84 lock onto the hair as the device 300 spins). That is, the fine micro-hook elements 82, 84 grab the fine hair that is disposed inside the drain pipe.

In other embodiments, the plurality of hook elements of the drain cleaning device 300 may comprise a hook material strip 30 (e.g., made from the hook portion of Velcro®—see e.g., FIGS. 5 and 9), rather than being injection-molded micro-hook elements.

Figure 47:
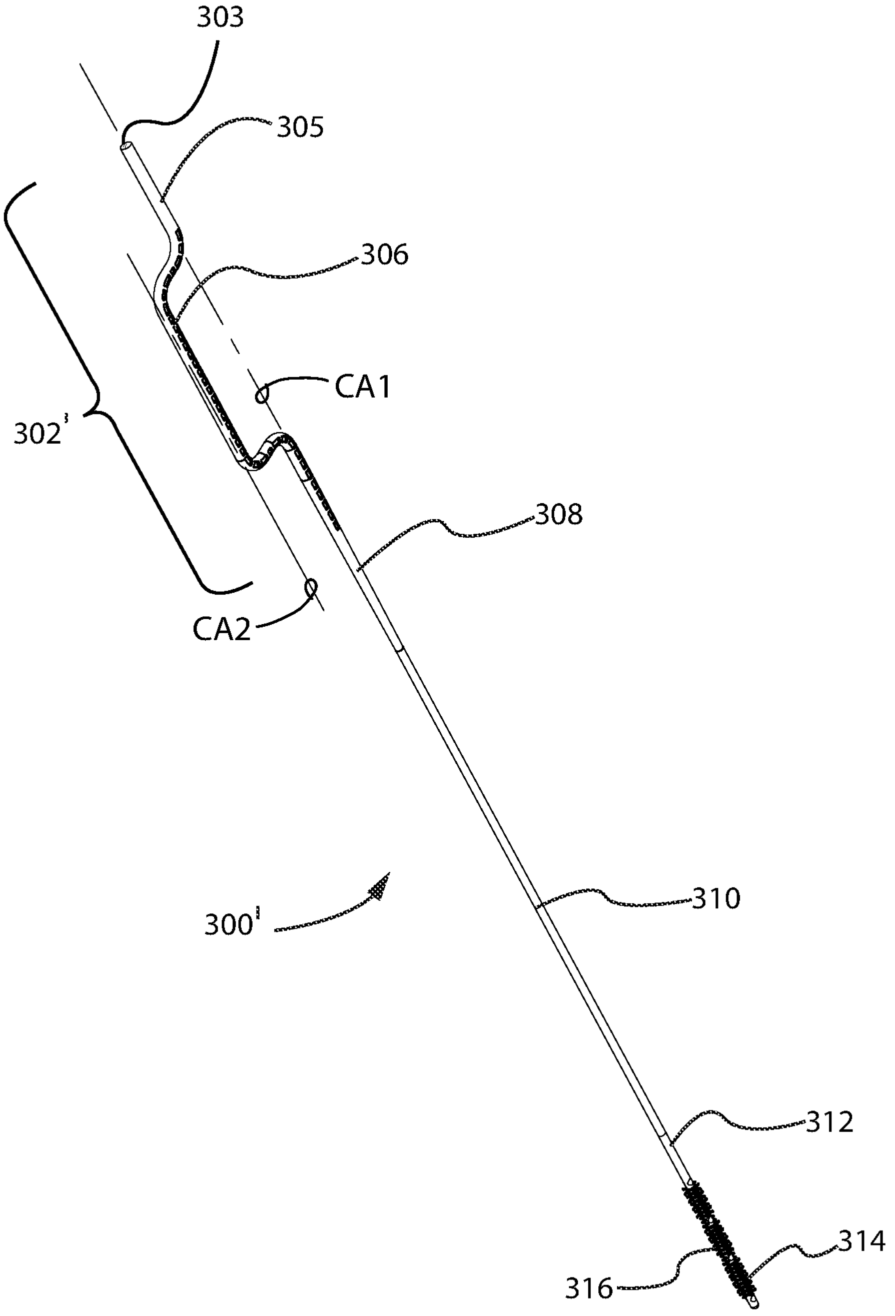
FIG. 47 is a perspective view of a drain cleaning device, according to an eighth embodiment of the invention.

Yet another illustrative embodiment of the drain cleaning device is seen generally at 300' in FIG. 47. Referring to this figure, it can be seen that, in most respects, the illustrative embodiment of FIG. 47 is similar to that of the illustrative embodiment of FIGS. 40-46. Moreover, many elements are common to both of the embodiments. For the sake of brevity, the elements that the illustrative embodiment of FIG. 47 has in common with the embodiment of FIGS. 40-46 will not be discussed in detail because these components have already been described above.

Like drain cleaning device 300 described above, the drain cleaning device 300' of the illustrative embodiment of FIG. 47 generally comprises a handle section 302' with an offset handle segment 306; an elongated rod section 310 with a first end portion 308 connected to the handle section 302'; and a tip section 314 connected to a second end portion 312 of the elongated rod section 310, the tip section 314 including a plurality of hook elements 316 disposed thereon, the plurality of hook elements 316 configured to grab and collect debris from a drain pipe. Similar to the drain cleaning devices 10, 10', 100, 200, 200', 300 described above, the drain cleaning device 300' is used for removing debris from a drain (e.g., from the drain pipe 48 of the drain 46 depicted in FIG. 8).

However, unlike drain cleaning device 300 described above, the handle section 302' of the drain cleaning device 300' of the illustrative embodiment of FIG. 47 does not have a top handle body portion 304 disposed above the offset handle portion. Rather, as shown in FIG. 47, a top handle shaft portion 305 is disposed above the U-shaped offset handle portion. In the illustrative embodiment, the top handle shaft portion 305 has a cross-section that is generally the same as the remainder of the handle section 302', and the top handle shaft portion 305 terminates at an upper end 303.

Figure 50:
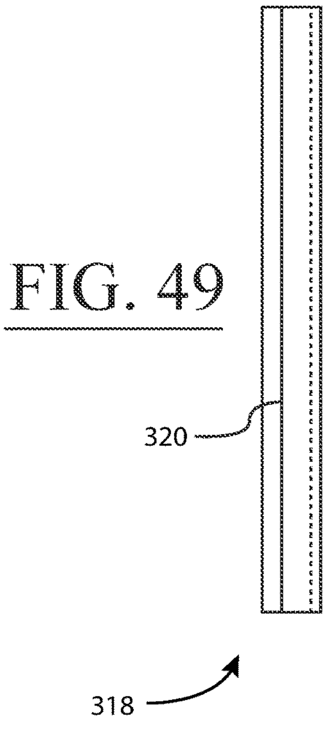
FIG. 50 is a perspective view of a drain cleaning device, according to the ninth embodiment of the invention, which includes the sleeve member of FIGS. 48 and 49.

Still another illustrative embodiment of the drain cleaning device is seen generally at 300" in FIG. 50. Referring to this figure, it can be seen that, in most respects, the illustrative embodiment of FIG. 50 is similar to that of the illustrative embodiments of FIGS. 40-46 and FIG. 47. Moreover, many elements are common to all of the embodiments. For the sake of brevity, the elements that the illustrative embodiment of FIG. 50 has in common with the embodiments of FIGS. 40-46 and FIG. 47 will not be discussed in detail because these components have already been described above.

Like drain cleaning devices 300, 300' described above, the drain cleaning device 300" of the illustrative embodiment of FIG. 50 generally comprises a handle section 302" with an offset handle segment 306; an elongated rod section 310 with a first end portion 308 connected to the handle section 302"; and a tip section 314 connected to a second end portion 312 of the elongated rod section 310, the tip section 314 including a plurality of hook elements 316 disposed thereon, the plurality of hook elements 316 configured to grab and collect debris from a drain pipe. Similar to the drain cleaning devices 10, 10', 100, 200, 200', 300, 300' described above, the drain cleaning device 300" is used for removing debris from a drain (e.g., from the drain pipe 48 of the drain 46 depicted in FIG. 8).

Figure 48:
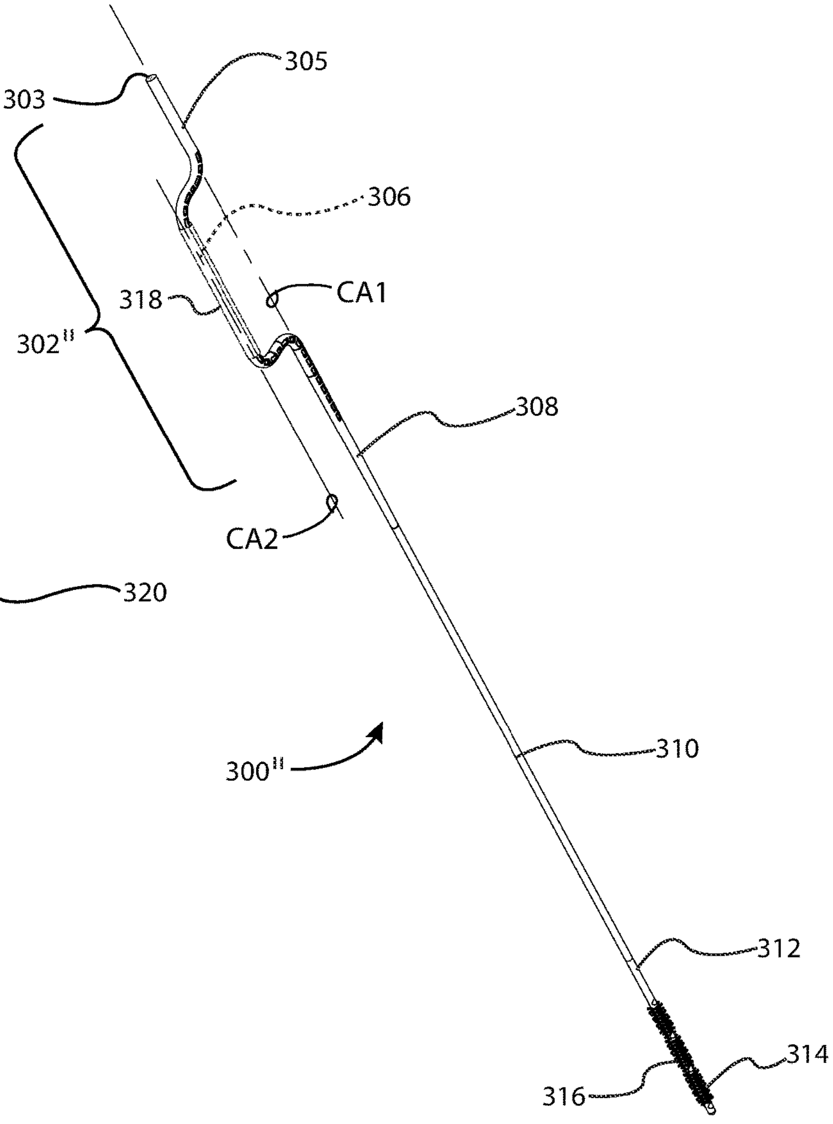
FIG. 48 is a top plan view of a sleeve member of a ninth embodiment of the invention.
Figure 49:
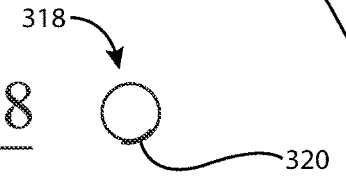
FIG. 49 is a side elevational view of the sleeve member of FIG. 48.

However, unlike drain cleaning device 300' described above, the handle section 302" of the drain cleaning device 300" of the illustrative embodiment of FIG. 50 has a sleeve member 318 rotatably disposed on the offset handle segment 306. In the illustrative embodiment, the sleeve member 318 has an open seam (see FIGS. 48 and 49) that allows the sleeve member 318 to be placed over the offset handle segment 306 of the handle section 302", and then sealed up at the area of the overlapping edges 320 of the sleeve member 318. In the illustrative embodiment, the sleeve member 318 may be formed from a piece of thin extruded plastic with a slit, or from a thin molded plastic sleeve.

In the illustrative embodiment of FIG. 50, one hand of a user is placed on the top handle shaft portion 305, and the other hand of the user is placed on the sleeve member 318 (for holding the sleeve member 318 stationary relative to the offset handle segment 306 that is rotating) so as to spin the device 300" in a 360-degree manner without the need to release the handle when unclogging a drain.

Figures 51, 52:
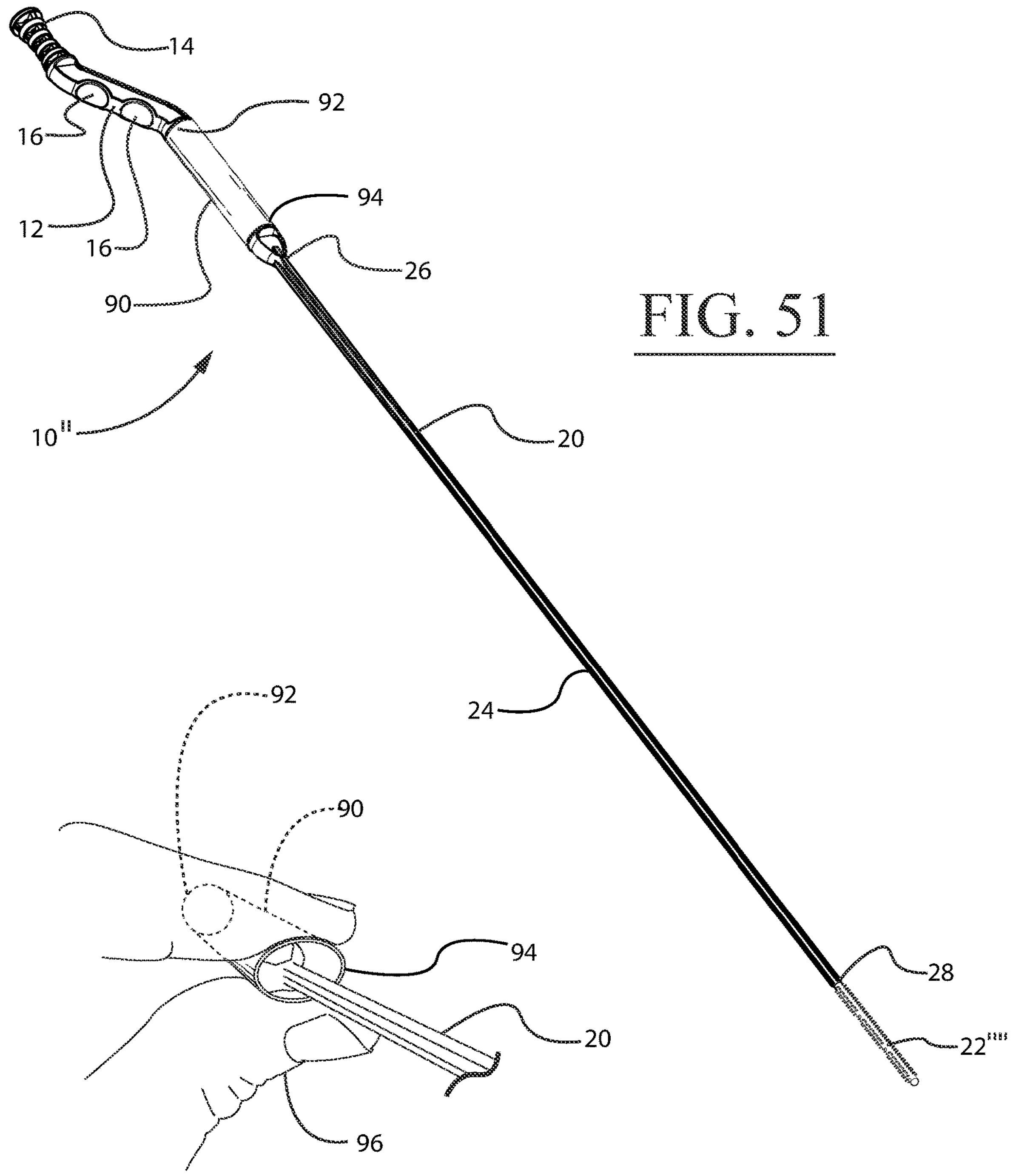
FIG. 51 is a perspective view of a drain cleaning device, according to a tenth embodiment of the invention.
FIG. 52 is a perspective view illustrating the manner in which a sleeve member is inserted onto the drain cleaning device of FIG. 51.

Yet another illustrative embodiment of the drain cleaning device is seen generally at 10" in FIG. 51. Referring to this figure, it can be seen that, in most respects, the illustrative embodiment of FIG. 51 is similar to that of the illustrative embodiment of FIGS. 1-2. Moreover, many elements are common to both of the embodiments. For the sake of brevity, the elements that the illustrative embodiment of FIG. 51 has in common with the embodiment of FIGS. 1-2 will not be discussed in detail because these components have already been described above.

Like drain cleaning device 10 described above, the drain cleaning device 10" of the illustrative embodiment of FIG. 51 generally comprises a handle section 12; an elongated rod section 20 with a first end portion 26 connected to the handle section 12; and a tip section 22"" connected to a second end portion 28 of the elongated rod section 20, the tip section 22"" including a plurality of hook elements 82, 84 disposed thereon (see FIG. 10), the plurality of hook elements 82, 84 configured to grab and collect debris from a drain pipe. Similar to the drain cleaning devices 10, 10', 100, 200, 200', 300, 300', 300" described above, the drain cleaning device 10" is used for removing debris from a drain (e.g., from the drain pipe 48 of the drain 46 depicted in FIG. 8).

However, unlike drain cleaning device 10 described above, the handle section 12 of the drain cleaning device 10" of the illustrative embodiment of FIG. 51 has a sleeve member 90 rotatably disposed on the lower handle portion that is connected to the first end portion 26 of the elongated rod section 20. In the illustrative embodiment, the sleeve member 90 has a first end 92 and a second end 94, and the sleeve member 90 may be formed from a thin bendable plastic material. As shown in FIG. 52, in order to insert the sleeve member 90 onto the drain cleaning device 10", the ends 92, 94 of the flexible sleeve member 90 may be pinched by a user's fingers 96 to widen the sleeve member 90 so that it can be fitted over the portion of the handle section 12 having the widest cross-section that connects to the first end portion 26 of the elongated rod section 20 (i.e., in FIG. 52, the first end 92 of the flexible sleeve member 90 is compressed, while the second end 94 of the flexible sleeve member 90 has expanded back to its generally uncompressed configuration). Once the sleeve member 90 is installed on the handle section 12, the flexible material forming the sleeve member 90 flexes back into its round configuration after it clears the widest cross-sectional portion of the handle section 12. Advantageously, the sleeve member 90 stays in place on the handle section 12 without falling off the handle section 12 because the rounded diameter of the sleeve member 90 is less than the widest cross-sectional portion of the handle section 12.

In the illustrative embodiment of FIG. 51, one hand of a user is placed on the upper hourglass-shaped portion 14 of the handle section 12, and the other hand of the user is placed on the sleeve member 90 (for holding the sleeve member 90 stationary relative to the lower handle portion of the handle section 12 that is rotating) so as to spin the device 10" in a 360-degree manner without the need to release the handle when unclogging a drain.

In the illustrative embodiment, the handle, rod, and tip sections of the drain cleaning devices 10, 10', 10", 50, 80, 200, 200', 300, 300', 300" may be molded from a single piece of plastic (i.e., these sections of the devices 10, 10', 10", 50, 80, 200, 200', 300, 300', 300" may have a single piece construction).

It is readily apparent that the aforedescribed drain cleaning device 10, 10', 10", 50, 80, 100, 200, 200', 300, 300', 300" offers numerous advantages. For example, the drain cleaning device 10, 10', 10", 50, 80, 100, 200, 200', 300, 300', 300" effectively cleans a bathroom drain or other type of drain by unblocking the drain of accumulated hair and other debris. The drain cleaning device 10, 10', 10", 50, 80, 100, 200, 200', 300, 300', 300" is designed to be used as a do-it-yourself (DYI) upper drain cleaning device.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A drain cleaning device for removing debris from a drain, the drain cleaning device comprising:

a detachable handle section having a proximal end portion and a distal end portion, the distal end portion of the detachable handle section being configured to be coupled to a proximal end portion of a drain cleaning stick; and the drain cleaning stick including:

an elongated rod section having a first end and a second end oppositely disposed relative to the first end, the first end of the elongated rod section being connected to the detachable handle section; and a tip section connected to the second end of the elongated rod section, the tip section including a central core portion and a plurality of protruding elements integrally formed with the central core portion, the plurality of protruding elements being arranged in multiple rows on the tip section, at least one row of the multiple rows comprising T-shaped projections spaced apart from one another along a longitudinal length of the tip section, and the plurality of protruding elements configured to grab and collect debris from the drain pipe.

2. The drain cleaning device according to claim 1, wherein the distal end portion of the detachable handle section comprises one or more recesses formed therein that are configured to interlock with one or more corresponding protrusions on the proximal end portion of the drain cleaning stick.

3. The drain cleaning device according to claim 2, further comprising a sleeve member that is slidable along a length of the detachable handle section between (i) a disengaged position where the drain cleaning stick is able to be released from the detachable handle section, and (ii) an engaged position where the distal end portion of the detachable handle section is locked into engagement with the proximal end portion of the drain cleaning stick.

4. The drain cleaning device according to claim 3, wherein, in the engaged position of the sleeve member, the sleeve member is rotatably disposed about the detachable handle section, the sleeve member configured to be grasped by a hand of a user during the spinning of the drain cleaning device by the user so as to help stabilize the drain cleaning device, the drain cleaning device being configured to be rotated relative to the sleeve member while the sleeve member is held stationary by the hand of the user.

5. The drain cleaning device according to claim 1, wherein the distal end portion of the detachable handle section comprises a first partial cylinder section and the proximal end portion of the drain cleaning stick comprises a second partial cylinder section, the first partial cylinder section on the distal end portion of the detachable handle section configured to engage with the second partial cylinder section on the proximal end portion of the drain cleaning stick such that a generally complete cylinder section is formed.

6. The drain cleaning device according to claim 1, wherein the distal end portion of the detachable handle section is configured to be removably coupled to the proximal end portion of the drain cleaning stick such that the drain cleaning stick is able to be replaced after being used to remove the debris from the drain pipe.

7. The drain cleaning device according to claim 6, wherein the drain cleaning stick is configured to be discarded after being used to remove the debris from the drain pipe.

8. The drain cleaning device according to claim 1, wherein the plurality of protruding elements are in the form of a plurality of injection-molded micro-hook elements.

9. The drain cleaning device according to claim 8, wherein at least some of the plurality of injection-molded micro-hook elements are in the form of inverted J-shaped projections protruding outwardly from the central core portion of the tip section of the drain cleaning stick.

10. The drain cleaning device according to claim 8, wherein the T-shaped projections protrude outwardly from the central core portion of the tip section of the drain cleaning stick.

11. A drain cleaning device for removing debris from a drain, the drain cleaning device comprising:

a handle section, the handle section including at least one of: (i) an ergonomic handle body portion configured to fit comfortably into a hand of a user, and (ii) an offset handle portion with a handle segment that is offset relative to a central longitudinal axis of the drain cleaning device, the handle section configured to accommodate the hand of the user during the spinning of the drain cleaning device by the user;

an elongated rod section having a first end and a second end oppositely disposed relative to the first end, the first end of the elongated rod section being connected to the handle section; and a tip section connected to the second end of the elongated rod section, the tip section including a central core portion and a plurality of protruding elements extending from the central core portion, the plurality of protruding elements being arranged in multiple rows on the tip section, at least one row of the multiple rows comprising T-shaped projections spaced apart from one another along a longitudinal length of the tip section, and the plurality of protruding elements configured to grab and collect debris from the drain pipe.

12. The drain cleaning device according to claim 11, wherein the handle section includes the ergonomic handle body portion configured to fit comfortably into the hand of the user, and the ergonomic handle body portion has a partially spherical shape or substantially spherical shape.

13. The drain cleaning device according to claim 12, wherein the ergonomic handle body portion with the partially spherical shape or substantially spherical shape has one or more surfaces with a grid-like pattern.

14. The drain cleaning device according to claim 11, wherein the handle section includes the offset handle portion with the handle segment that is offset relative to the central longitudinal axis of the drain cleaning device, and the handle segment has a segment longitudinal axis that is disposed generally parallel to, and radially offset from the central longitudinal axis of the drain cleaning device.

15. The drain cleaning device according to claim 14, wherein the offset handle portion of the handle section is generally U-shaped.

16. The drain cleaning device according to claim 14, wherein the handle section further comprises a top handle body portion disposed above the offset handle portion, the top handle body portion being substantially wider than a remainder of the handle section so as to fit comfortably into the hand of the user.

17. The drain cleaning device according to claim 11, wherein the plurality of protruding elements are in the form of a plurality of injection-molded micro-hook elements.

18. The drain cleaning device according to claim 17, wherein at least some of the plurality of injection-molded micro-hook elements are in the form of inverted J-shaped projections protruding outwardly from the central core portion of the tip section of the drain cleaning device.

19. The drain cleaning device according to claim 17, wherein the T-shaped projections protrude outwardly from the central core portion of the tip section of the drain cleaning device.

* * * * *